US012715201B2

(12) United States Patent
Borchardt et al.

(10) Patent No.: US 12,715,201 B2
(45) Date of Patent: Aug. 25, 2026

(54) THERMOPLASTIC FILMS AND BAGS WITH IMPROVED STRENGTH PROPERTIES CREATED BY ANGLED RING ROLLING

(71) Applicant: THE GLAD PRODUCTS COMPANY, Oakland, CA (US)

(72) Inventors: Michael G. Borchardt, Naperville, IL (US); David A. Bailey, Cincinnati, OH (US)

(73) Assignee: THE GLAD PRODUCTS COMPANY, Oakland, CA (US)

( * ) Notice: Subject to any disclaimer, the term of this patent is extended or adjusted under 35 U.S.C. 154(b) by 507 days.

(21) Appl. No.: 18/298,676

(22) Filed: Apr. 11, 2023

(65) Prior Publication Data

US 2023/0364895 A1 Nov. 16, 2023

Related U.S. Application Data

(60) Provisional application No. 63/364,765, filed on May 16, 2022.

(51) Int. Cl.
*B32B 27/08* (2006.01)
*B32B 27/32* (2006.01)

(52) U.S. Cl.
CPC .............. *B32B 27/08* (2013.01); *B32B 27/32* (2013.01); *B32B 2250/02* (2013.01);
(Continued)

(58) Field of Classification Search
CPC ..... B32B 27/08; B32B 27/32; B32B 2250/02; B32B 2250/03; B32B 2250/24;
(Continued)

(56) References Cited

U.S. PATENT DOCUMENTS 3,509,005 A 4/1970 Hartig
4,116,892 A 9/1978 Schwarz
(Continued)

FOREIGN PATENT DOCUMENTS

CN 101616791 B 8/2013
EP 1121239 B1 9/2003
(Continued)

OTHER PUBLICATIONS

PCT/US2023/065626—International Search Report and Written Opinion, dated Oct. 10, 2023.

*Primary Examiner* — Michael C Miggins
(74) *Attorney, Agent, or Firm* — Keller Preece PLLC

(57) ABSTRACT

The present disclosure relates to thermoplastics film, multi-film structures, and bags including enhanced physical properties. For example, one or more implementations include tailoring the physical properties of thermoplastic films by forming ribs using ring rolling in the films that extend at an angle relative to a direction in which the film is extruded (e.g., the machine direction). In other words, one or more implementations include films with a pattern of ribs extending at an acute angle to the predominate direction of molecular orientation of the thermoplastic film. The angled ribs increase the machine direction tear resistance of the thermoplastic film by intersecting any machine direction propagating tears and redirecting the tears towards the higher tear resistant transverse direction.

18 Claims, 12 Drawing Sheets

(52) U.S. Cl.
CPC ....... *B32B 2250/03* (2013.01); *B32B 2250/24* (2013.01); *B32B 2305/70* (2013.01); *B32B 2307/518* (2013.01); *B32B 2307/5825* (2013.01); *B32B 2323/046* (2013.01); *B32B 2439/06* (2013.01)

(58) Field of Classification Search
CPC .......... B32B 2307/70; B32B 2307/518; B32B 2307/5825; B32B 2323/046; B32B 2439/06; B32B 7/10; B32B 2307/582; B32B 2307/718; B32B 2439/46; B32B 7/04; B32B 7/05; B32B 3/30; B32B 7/022
See application file for complete search history.

(56) References Cited

U.S. PATENT DOCUMENTS

| | | | |
|---|---|---|---|
| 4,251,585 | A | 2/1981 | Schwarz |
| 4,258,166 | A | 3/1981 | Canterino et al. |
| 4,315,963 | A | 2/1982 | Havens |
| 4,374,690 | A | 2/1983 | Canterino et al. |
| 4,464,815 | A | 8/1984 | Canterino et al. |
| 5,401,459 | A | 3/1995 | Nichols et al. |
| 5,562,932 | A | 10/1996 | Rieker |
| 5,626,944 | A | 5/1997 | Rasmussen |
| 5,912,063 | A | 6/1999 | Osawa et al. |
| 6,383,431 | B1 | 5/2002 | Dobrin et al. |
| 6,394,651 | B2 | 5/2002 | Jackson |
| 6,605,172 | B1 | 8/2003 | Anderson et al. |
| 6,952,510 | B1 | 10/2005 | Karlsen et al. |
| 6,953,510 | B1 | 10/2005 | Mackay et al. |
| 7,794,848 | B2 | 9/2010 | Breese |
| 8,124,243 | B2 | 2/2012 | Wright et al. |
| 8,357,440 | B2 | 1/2013 | Hall |
| 8,853,340 | B2 | 10/2014 | Borchardt |
| 8,865,289 | B2 | 10/2014 | Borchardt |
| 9,108,390 | B2 | 8/2015 | Borchardt |
| 9,216,538 | B2 | 12/2015 | Borchardt |
| 9,290,303 | B2 | 3/2016 | Cobler |
| 9,365,323 | B1 | 6/2016 | Cobler |
| 9,403,329 | B2 | 8/2016 | Towler |
| 9,463,904 | B2 | 10/2016 | Cobler |
| 9,546,277 | B2 | 1/2017 | Cobler |
| 10,279,537 | B2 | 5/2019 | Borchardt |
| 10,543,658 | B2 | 1/2020 | Borchardt et al. |
| 10,918,471 | B2 | 2/2021 | Towler |
| 2005/0178493 | A1 | 8/2005 | Broering et al. |
| 2006/0093766 | A1 | 5/2006 | Savicki et al. |
| 2008/0253699 | A1 | 10/2008 | Hall |
| 2010/0098354 | A1 | 4/2010 | Fraser et al. |
| 2019/0315567 | A1 | 10/2019 | Cobler |

FOREIGN PATENT DOCUMENTS

| | | | |
|---|---|---|---|
| EP | 2501768 | A4 | 5/2013 |
| KR | 20080012351 | A | 2/2008 |
| WO | 2021130612 | A1 | 7/2021 |
| WO | 2021130613 | A1 | 7/2021 |
| WO | 2021130616 | A1 | 7/2021 |
| WO | 2021130628 | A1 | 7/2021 |
| WO | 2021130659 | A1 | 7/2021 |
| WO | 2021130660 | A1 | 7/2021 |

THERMOPLASTIC FILMS AND BAGS WITH IMPROVED STRENGTH PROPERTIES CREATED BY ANGLED RING ROLLING

CROSS REFERENCE TO RELATED APPLICATIONS

This application claims the benefit of, and priority to U.S. Provisional Patent Application No. 63/364,765, filed May 16, 2022, which is incorporated herein by reference in its entirety.

BACKGROUND

Thermoplastic films are a common component in various commercial and consumer products. For example, food wraps, grocery bags, trash bags, sacks, and packaging materials are products that are commonly made from thermoplastic films. Additionally, feminine hygiene products, baby diapers, adult incontinence products, and many other products include thermoplastic films to one extent or another.

Thermoplastic films have a variety of different strength parameters that manufacturers of products incorporating a thermoplastic film component may attempt to manipulate to ensure that the film is suitable for use its intended use. For example, manufacturers may attempt to increase or otherwise control the tensile strength of a thermoplastic film. The tensile strength of a thermoplastic film is the maximum stress that a film can withstand while being stretched before it fails. Another strength parameter that manufacturers may want to increase or otherwise control is tear resistance. The tear resistance of a thermoplastic film is the amount of force required to propagate or enlarge a tear that has already been created in a film. Still further, a manufacturer may want to increase or otherwise control a film's impact resistance.

Often thermoplastic films are made using a blown film process, which orients the polymer chains in resultant films predominately in the machine direction. As used herein, the term "machine direction" refers to the direction along the length of the film, or in other words, the direction of the film as the film is formed during extrusion and/or coating. As used herein, the term "transverse direction" refers to the direction across the film or perpendicular to the machine direction. Due to the predominately machine direction molecular orientation imparted during the film forming process, blown films often have toughness properties that are inherently weaker in the machine direction (MD) compared to the transverse direction (TD). When subjected to impact testing the resultant holes in a blown film, when examined carefully, show that the hole is generally elliptically shaped, with the major axis of the ellipse being aligned in the machine direction of the film consistent with the molecular orientation of the film. Resistance to propagation of an initiated tear is also weaker in the machine direction, often times 5-10 times lower than in the transverse direction. In other words, tears propagate more easily in a film along the direction parallel in which the film is oriented (e.g., the predominate direction/orientation of polymer chains of the film). The inherently low MD tear resistance can define the minimal strength property of a film, which designers of product based on such films must consider when contemplating film formulation and processing conditions. So there exists a need to create increased MD tear and in general, toughness properties of blown films in a manner that is independent of how the film is extruded. In other words, there exists a need to overcome weakness of various properties due to the molecular orientation imparted to a blown film from the blown film process.

In addition to the foregoing, increasing manufacturing costs for thermoplastic films have led to a trending effort to decrease material usage (e.g., by making thinner webs). As a result, the tendency of some conventional thermoplastic films to be prone to tearing, ruptures, and other failures is often exacerbated when the film gauge is decreased to save costs. Additionally, a decrease in material in a product due to use of thinner films can also trigger undesirable visual and/or tactile cues (e.g., that less material is used and therefore the thermoplastic film must be weak or cheaply made). Regardless of actual material properties, these conventional thermoplastic films can visually and/or haptically convey material properties that are contrary to consumer preferences—thereby leading to a consumer perception of low durability and strength.

BRIEF SUMMARY

Implementations of the present invention solve one or more of the foregoing or other problems in the art with apparatus and methods for tailoring the physical properties of thermoplastic films by incrementally stretching the films at an angle relative to a direction in which the film is extruded (e.g., the machine direction) via a ring rolling process. In particular, one or more implementations of include films incrementally-stretched in a direction non-parallel to the machine direction and the transverse direction of the thermoplastic film. For example, one or more implementations include films with a ribbed pattern of thicker and thinner linear ribs extending across the film at an acute angle to the machine direction of the film. In other words, one or more implementations include films with a ribbed pattern of thicker and thinner linear ribs extending across the film at an acute angle to the predominate direction of molecular orientation of the thermoplastic film. The angled linear ribs increase the machine direction tear resistance of the thermoplastic film by intersecting any MD propagating tears and redirecting such tears towards the higher tear resistant transverse direction.

For example, one implementation of a thermoplastic film laminate includes a first thermoplastic film comprising a first plurality of alternating thicker and thinner ribs. The first plurality of alternating thicker and thinner ribs extend continuously across the first thermoplastic film at a first acute angle relative to a machine direction of the first thermoplastic film. The thermoplastic film laminate also includes a second thermoplastic film comprising a second plurality of alternating thicker and thinner ribs. The second plurality of alternating thicker and thinner ribs extend continuously across the second thermoplastic film at a second acute angle relative to a machine direction of the second thermoplastic film. Additionally, a machine direction tear resistance of the first thermoplastic film comprising the first plurality of alternating thicker and thinner ribs is greater than a machine direction tear resistance of the first thermoplastic film prior to formation of the first plurality of alternating thicker and thinner ribs.

Additionally, an implementation of a multi-layer thermoplastic bag includes a first thermoplastic bag formed from a first thermoplastic film. The first thermoplastic bag comprises first and second opposing sidewalls joined together along a first side edge, an opposite second side edge, an open first top edge, and a closed first bottom edge. The multi-layer thermoplastic bag includes a second thermoplastic bag formed from a second thermoplastic film. The second thermoplastic bag is positioned within the first thermoplastic bag. The second thermoplastic bag comprises third and fourth opposing sidewalls joined together along a third side edge, an opposite fourth side edge, an open second top edge, and a closed second bottom edge. The multi-layer thermoplastic bag further includes a first plurality of alternating thicker and thinner ribs extending continuously across the first thermoplastic bag at a first acute angle relative to a machine direction of the first thermoplastic film. The first plurality of alternating thicker and thinner ribs are configured to redirect propagating tears away from the machine direction of the first thermoplastic film.

In addition to the forgoing, a method of manufacturing a thermoplastic film with increased strength involves directing a thermoplastic film in a machine direction. The thermoplastic film comprises a first machine direction tear resistance and a first basis weight. The method also includes creating a plurality of alternating thicker and thinner ribs in the thermoplastic film that extend at an acute angle relative to the machine direction by passing the thermoplastic film through a pair of intermeshing ring rollers with teeth positioned at the acute angle relative to the machine direction. The thermoplastic film with the plurality of alternating thicker and thinner ribs comprises a second machine direction tear resistance greater than the first machine direction tear resistance. Additionally, the thermoplastic film with the plurality of alternating thicker and thinner ribs comprises a second basis weight less than the first basis weight.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims or may be learned by the practice of such exemplary embodiments as set forth hereinafter.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1A:
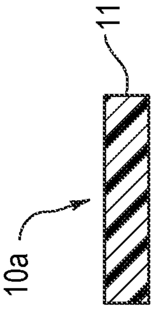
FIGS. 1A-1C illustrate views of various films structures in accordance with one or more implementations.

One or more implementations of the present invention include apparatus and methods for tailoring the physical properties of thermoplastic films by configuring ribs created by ring rolling to reduce tear propagation, and thereby, increase tear resistance. In particular, one or more implementations of the present invention include incrementally-stretched films with ribs angled relative to the machine direction and products formed therewith. The angled ribs serve to intercept tears propagating in the machine direction. In particular, the angled configuration of the ribs intercepts propagating tears and stops the tears or redirects the tears toward the more tear resistance transverse direction. Additionally, in one or more implementations, the angled configuration of the ribs increases the transverse direction tear resistance.

More particular, one or more implementations comprise a pattern of alternative thicker and thinner ribs. The repeating pattern of ribs creates a film wide set of obstacles to prevent tear propagation. For example, a tear propagating the machine direction will run into a first angled rib that will stop the tear from propagating or redirect the tear towards the more tear resistant transverse direction. The now TD propagating tear may redirect again toward the less tear resistant machine direction where it will intersect another angled rib that will stop the tear from propagating or again redirect the tear towards the more tear resistant transverse direction.

One or more implementations include multi-layer film structures and products produced therefrom that include one or more layers having ring-rolled ribs angled relative to the machine direction. For example, a multi-layer film structure can include a first layer having a pattern of alternating thicker and thinner ribs extending at an angle relative to the machine direction. One or more additional layers in the multi-layer film structure can be devoid of such ribs. In still further implementations, each layer in a multi-layer film structure includes a pattern of alternating thicker and thinner ribs extending at an angle relative to the machine direction. In such implementations, each layer can include the same pattern of alternating thicker and thinner ribs. Alternatively, each layer can include a different pattern alternating thicker and thinner ribs extending at an angle relative to the machine direction. For example, the pattern of alternating thicker and thinner ribs in each layer of a multi-layer film structure can extend at a different angle relative to the machine direction of the film. In one or more implementations, the pattern of alternating thicker and thinner ribs in one layer extend in a non-parallel direction to the direction of the pattern of alternating thicker and thinner ribs in another layer of the multi-layer film structure. Such a configuration creates a crossed rib laminate where the pattern of alternating thicker and thinner ribs in one layer cross the pattern of alternating thicker and thinner ribs in another layer. In one or more implementations, the crossed rib laminate is a faux cross laminate because the molecular orientation (e.g., the machine direction) of each of the films is aligned or parallel. Such crossed rib laminates can provide even greater increased to tear resistance and other strength properties.

Furthermore, one or more implementations provide thermoplastic films, and products made there from, with reduced basis weight yet maintained or increased MD tear resistance and TD tear resistance. In particular, ring rolling the films at an angle relative to the machine direction stretches/elongates the film in both the machine direction and the transverse direction thereby reducing the basis weight of the film. Despite a thinner average gauge, one or more implementation have increased MD tear resistance due to the angled ribs. Indeed, despite the thinner average gauge, one or more implementations have increased MD tear resistance and TD tear resistance. Thus, one or more implementations can reduce the material needed to produce a product without compromising important material properties.

One will appreciate in light of the disclosure herein that such material reductions can provide significant cost savings. Indeed, incrementally stretching a flat film can decrease the gauge by weight of the film. This can provide a manufacturer with the ability to produce an initially thicker flat film, which can increase production ease. The initially thicker flat film can then be stretched to a thickness suitable for use as a trash bag or other products. Thus, implementations of the present can produce a cost-effective film by reducing the effective gauge to reduce material costs, while still providing appropriate tear resistance.

Some consumers may associate thinner films with decreased strength. Indeed, such consumers may feel that they are receiving less value for their money when purchasing thermoplastic film products with thinner gauges. In one or more implementations, a consumer may not readily detect that one or more incrementally stretched films of the present invention have a reduced gauge. In particular, a consumer may associate the thickness of the thermoplastic film with the thicker ribs of an alternating pattern of thick and thin ribs.

In addition to the foregoing, one or more implementations provide stretched thermoplastic films with physical features that consumers can associate with the improved strength properties. In particular, one or more implementations include thermoplastic films with ribs extending across the film in a direction angled relative to the transverse and/or machine directions. The ribs can notify a consumer that the thermoplastic film has been processed to increase the strength of the film.

As alluded to previously, one or more implementations include methods of incrementally stretching a film with the unexpected result of maintaining MD tear resistance and optionally TD tear resistance. In particular, as will be described in greater detail below, one or more implementations provide synergistic effects when incrementally cold-stretching thermoplastic films. The films of one or more implementations of the present invention can undergo one or more film stretching processes under ambient or cold (non-heated) conditions.

Implementations of the present invention that include cold ring-rolling differ significantly from most conventional processes that stretch films under heated conditions. Stretching under ambient or cold conditions in accordance with one or more implementations can constrain the molecules in the film so they are not as easily oriented as under heated conditions. This, in combination with configured the ribs to extend at an angle (e.g., an acute angle) relative to the machine direction provide the unexpected result of increasing MD tear resistance (an optionally TD tear resistance) while also providing a reduction in basis weight.

Additionally, typically certain polymers (such as those containing post-consumer reclaim or lower grade materials) are not used in trash bags due to their tendency/potential to fail due to weaker/inconsistent strength properties. This is despite the fact that the materials can be lower cost and more environmentally friendly than commonly used virgin higher-grade materials. One or more implementations of the present invention allow for the use films formed from or with post-consumer reclaim or lower grade virgin materials (e.g., butene copolymer) or composites thereof. In particular, incrementally stretching such films and configuring the ring-rolled ribs to extend in a direction at an acute angle relative to the machine direction in accordance with one or more implementations of the present invention can increase the strength properties of such films, thereby, making them suitable for use in products, such as trash bags, where strength properties are important.

In addition to creating ring-rolled ribs at acute angles relative to the machine direction, one or more implementations include discontinuous bonding to enhance the strength and other properties of the film. In particular, one or more implementations provide for forming bonds between adjacent layers of a multi-layer film that are relatively light such that forces acting on the multi-layer film are first absorbed by breaking the bonds rather than or prior to tearing or otherwise causing the failure of the layers of the multi-layer film. Such implementations can provide an overall thinner film employing a reduced amount of raw material that nonetheless has maintained or increased strength parameters. Alternatively, such implementations can use a given amount of raw material and provide a film with increased strength parameters.

In particular, the light bonds or bond regions of adjacent layers of multi-layer films in accordance with one or more implementations can act to first absorb forces via breaking of the bonds prior to allowing that same force to cause failure of the individual layers of the multi-layer film. Such action can provide increased strength to the multi-layer film. In one or more implementations, the light bonds or bond regions include a bond strength that is advantageously less than a weakest tear resistance of each of the individual films so as to cause the bonds to fail prior to failing of the film layers. Indeed, one or more implementations include bonds that the release just prior to any localized tearing of the layers of the multi-layer film.

Thus, in one or more implementations, the light bonds or bond regions of a multi-layer film can fail before either of the individual layers undergoes molecular-level deformation. For example, an applied strain can pull the light bonds or bond regions apart prior to any molecular-level deformation (stretching, tearing, puncturing, etc.) of the individual film layers. In other words, the light bonds or bond regions can provide less resistive force to an applied strain than molecular-level deformation of any of the layers of the multi-layer film. The inventors have surprisingly found that such a configuration of light bonding can provide increased strength properties to the multi-layer film as compared to a monolayer film of equal thickness or a multi-layer film in which the plurality of layers are tightly bonded together (e.g., coextruded).

One or more implementations of the present invention provide for tailoring the bonds or bond regions between layers of a multi-layer film to ensure light bonding and associated increased strength. For example, one or more implementations include modifying or tailoring one or more of a bond strength, bond density, bond pattern, or bond size between adjacent layers of a multi-layer film to deliver a film with strength characteristics better than or equal to the sum of the strength characteristics of the individual layers. Such bond tailoring can allow for multi-layer films at a lower basis weight (amount of raw material) to perform the same as or better than higher basis weight mono-layer or co-extruded films.

Relatively weak bonding and stretching of the two or more layers of the multi-layer film can be accomplished simultaneously through one or more suitable techniques. For example, bonding and stretching may be achieved by pressure (for example MD ring rolling, TD ring rolling, angled ring rolling, stainable network lamination, or embossing), or with a combination of heat and pressure. Alternately, a manufacturer can first stretch the films and then bond the films using one or more bonding techniques. For example, one or more implementations can include ultrasonic bonding to lightly laminate the film layers. Alternately or additionally, adhesives can laminate the films. Treatment with a Corona discharge can enhance any of the above methods. In one or more embodiments, the contacting surfaces/layers can comprise a tacky material to facilitate lamination. Prior to lamination, the separate layers can be flat film or can be subject to separate processes, such as stretching, slitting, coating and printing, and corona treatment.

As illustrated by the foregoing discussion, the present disclosure utilizes a variety of terms to describe features and benefits of a reinforced thermoplastic bag. Additional detail is now provided regarding the meaning of these terms. For example, as used herein, the terms "lamination," "laminate," and "laminated film," refer to the process and resulting product made by bonding together two or more layers of film or other material. The term laminate is also inclusive of coextruded multilayer films comprising one or more tie layers. The term "bonding," when used in reference to bonding of multiple layers may be used interchangeably with "lamination" of the layers. As a verb, "laminate" means to affix or adhere (by means of, for example, adhesive bonding, pressure bonding (e.g., ring rolling, embossing, SELFing, bond forming due to tackifying agents in one or more of the films), ultrasonic bonding, corona lamination, and the like) two or more separately made film articles to one another so as to form a multi-layer structure.

In one or more implementations, the lamination or bonding between bag layers and/or a plurality of fibers of the present disclosure may be non-continuous (i.e., discontinuous or partially discontinuous). As used herein the terms "discontinuous bonding" or "discontinuous lamination" refers to lamination of two or more layers where the lamination is not continuous in the machine direction and not continuous in the transverse direction. More particularly, discontinuous lamination refers to lamination of two or more layers with repeating bonded patterns broken up by repeating un-bonded areas in both the machine direction and the transverse direction of the film (or alternatively, random bonded areas broken up by random un-bonded areas).

As similarly used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article. Alternatively, partially discontinuous lamination can include two or more layers substantially continuous in the height of the article but not continuous in the width of the article. More particularly, partially discontinuous lamination refers to lamination of two or more layers with repeating bonded patterns broken up by repeating unbonded areas in either the machine direction or the transverse direction. In still further implementations, partially discontinuous lamination refers to lamination of two or more layers with random bonded patterns broken up by random unbonded areas.

As also used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces without integrity loss. Similarly, materials and structures that are flexible can conform to the shape of contacting objects without integrity loss. For example, a thermoplastic bag disclosed herein may include web materials which exhibit an "elastic-like" behavior in the direction of applied strain without the use of added traditional elastic. As used herein, the term "elastic-like" describes the behavior of web materials which when subjected to an applied strain, the web materials extend in the direction of the applied strain. When the applied strain is released, the web materials return, to a degree, to their pre-strained condition.

Film Materials

As an initial matter, the thermoplastic material of the films of one or more implementations can include, but are not limited to, any flexible or pliable material comprising a thermoplastic material and that can be formed or drawn into a web or film. Each individual film layer may itself include a single layer or multiple layers. Adjuncts may also be included, as desired (e.g., pigments, slip agents, anti-block agents, tackifiers, or combinations thereof). The thermoplastic material of the films of one or more implementations can include, but are not limited to, thermoplastic polyolefins, including polyethylene, polypropylene, and copolymers thereof. Besides ethylene and propylene, exemplary copolymer olefins include, but are not limited to, ethylene vinylacetate (EVA), ethylene methyl acrylate (EMA) and ethylene acrylic acid (EAA), or blends of such olefins. Various other suitable olefins and polyolefins will be apparent to one of skill in the art.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber, and combinations thereof. Suitable biodegradable polymers include, for example, aliphatic polyesters, such as polycaprolactone, polyesteramides, polylactic acid (PLA) and its copolymers, polyglycolic acid, polyalkylene carbonates (e.g., polyethylene carbonate), poly-3-hydroxybutyrate (PHB), poly-3-hydroxyvalerate (PHV), poly-3-hydroxybutyrate-co-4-hydroybutyrate, poly-3-hydroxybutyrate-co-3-hydroxyvalerate copolymers (PHBV), poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, and succinate-based aliphatic polymers (e.g., polybutylene succinate, polybutylene succinate adipate, polyethylene succinate, etc.); aliphatic-aromatic copolyesters (e.g., polybutylene adipate terephthalate, polyethylene adipate terephthalate, polyethylene adipate isophthalate, polybutylene adipate isophthalate, etc.); aromatic polyesters (e.g., polyethylene terephthalate, polybutylene terephthalate, etc.); and combinations thereof.

In at least one implementation of the present invention, a film can include linear low-density polyethylene. The term "linear low-density polyethylene" (LLDPE) as used herein is defined to mean a copolymer of ethylene and a minor amount of an alkene containing 4 to 10 carbon atoms. In addition, a LLDPE includes a density from about 0.910 to about 0.926 g/cm$^3$, and a melt index (MI) from about 0.5 to about 10. For example, one or more implementations of the present invention can use an octene co-monomer, solution phase LLDPE (MI=1.1; $\rho$=0.920). Additionally, other implementations of the present invention can use a gas phase LLDPE, which is a hexene gas phase LLDPE formulated with slip/AB (MI=1.0; $\rho$=0.920). One will appreciate that the present invention is not limited to LLDPE and can include "high density polyethylene" (HDPE), "low density polyethylene" (LDPE), "ultra-low-density polyethylene" (ULDPE), and "very low-density polyethylene" (VLDPE). Indeed, films made from any of the previously mentioned thermoplastic materials or combinations thereof can be suitable for use with the present invention. In one or more implementations, a non-virgin thermoplastic material is used. For example, one or more implementations include a composite that includes one or more of the foregoing or other virgin thermoplastic materials mixed with post-consumer reclaim or a lower-grade thermoplastic material. As used herein, post-consumer reclaim refers to thermoplastic materials that are recycled goods. In one or more implementations, post-consumer reclaim comprises the second, third, fourth, etc. use of a polymer and includes contaminants that can weaken the polymer. For example, post-consumer reclaim may include labels, inks, and adhesives that contaminate the recycled polymer and reduce its quality.

Indeed, implementations of the present invention can include any flexible or pliable thermoplastic material that may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

In addition to a thermoplastic material, films of one or more implementations of the present invention can also include one or more additives. Additional additives that may be included in one or more embodiments include slip agents, anti-block agents, voiding agents, or tackifiers. Additionally, one or more implementations of the present invention include films that are devoid of voiding agents. Some examples of inorganic voiding agents include calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, etc. Some examples of organic voiding agents for polyethylene (PE) include polystyrene and other polymers incompatible with PE and having the proper viscosity ratio relative to PE.

One will appreciate in light of the disclosure herein that manufacturers may form the films or webs to be used with one or more implementations of the present invention using a wide variety of techniques. For example, a manufacturer can form precursor mix of the thermoplastic material and one or more additives. The manufacturer can then form the film(s) from the precursor mix using conventional flat or cast extrusion or coextrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

In one or more implementations, one or more films of the present invention are blown film, or cast film. Blown film and cast film is formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present invention, can be a single screw type modified with a blown film die, an air ring, and continuous take off equipment.

In one or more implementations, a manufacturer can use multiple extruders to supply different melt streams, which a feed block can order into different channels of a multi-channel die. The multiple extruders can allow a manufacturer to form a multi-layered film with layers having different compositions. Such multi-layer film may later be non-continuously laminated with another layer of film to provide the benefits of the present invention.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded annular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more embodiments, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more embodiments the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more embodiments the polymer chains of the blown film are predominantly oriented in the machine direction (i.e., oriented more in the machine direction than the transverse direction).

The films of one or more implementations of the present invention can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.35 mils and about 0.6 mils. Additionally, the starting gauge of films of one or more implementations of the present invention may not be uniform. Thus, the starting gauge of films of one or more implementations of the present invention may vary along the length and/or width of the film.

As an initial matter, one or more layers of the films described herein can comprise any flexible or pliable material comprising a thermoplastic material and that can be formed or drawn into a web or film. As described above, the film includes a plurality of layers of thermoplastic films. Each individual film layer may itself include a single layer or multiple layers. In other words, the individual layers of the multi-layer film may each themselves comprise a plurality of laminated layers. Such layers may be significantly more tightly bonded together than the bonding provided by the purposely weak discontinuous bonding in the finished multi-layer film. Both tight and relatively weak lamination can be accomplished by joining layers by mechanical pressure, joining layers with adhesives, joining with heat and pressure, spread coating, extrusion coating, and combinations thereof. Adjacent sub-layers of an individual layer may be coextruded. Coextrusion results in tight bonding so that the bond strength is greater than the tear resistance of the resulting laminate (i.e., rather than allowing adjacent layers to be peeled apart through breakage of the lamination bonds, the film will tear).

Figure 1B:
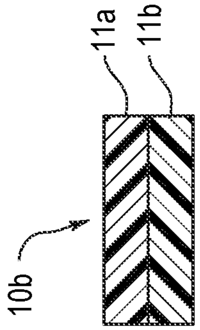

FIG. 1A illustrates a film ply 10*a* of a mono layer 11. In another implementation, as illustrated by FIG. 1B, a film ply 10*b* can have two layers (i.e., a bi-layered film). In particular, the film ply 10*b* can include a first layer 11*a* and a second layer 11*b*. The first and second layers 11*a*, 11*b* can optionally include different grades of thermoplastic material or include different additives, including polymer additives. In still another implementation, shown in FIG. 1C, a film ply 10*c* can include three layers (i.e., a tri-layered film). For example, FIG. 1C illustrates that the film 10*c* can include a first layer 11*c*, a second layer 11*d*, and a third layer 11*e*.

In one example, the film 10*a* can comprise a 0.5 mil, 0.920 density LLDPE, colored mono layer film containing 4.8% pigment that appears a first color. In an alternative embodiment, the film 10*a* can comprise a 0.5 mil, 0.920 density LLDPE, un-pigmented film mono layer film that appears clear or substantially clear. In still further embodiments, the film 10*a* can comprise a 0.5 mil, 0.920 density LLDPE, pigmented film that appears a second color.

Figure 1C:
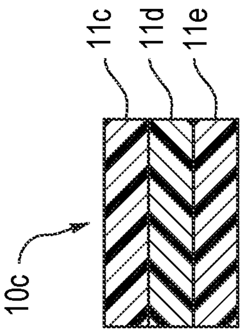

In at least one implementation, such as shown in FIG. 1C, a multilayered film 10*c* can include co-extruded layers. For example, the film 10*c* can include a three-layer B:A:B structure, where the ratio of layers can be 20:60:20. The exterior B layers (i.e., 11*c*, 11*e*) can comprise a mixture of hexene LLDPE of density 0.918, and metallocene LLDPE of density 0.920. The interior A core layer (11*d*) can comprise a mixture of hexene LLDPE of density 0.918, butene LLDPE of density 0.918, reclaimed resin from trash bags. Additionally, the A core layer 11*d* can include a pigment. For example, the A core layer 11*d* can include a colorant in an amount between about 0.1 percent and about 6%.

In another example, the film 10*c* is a coextruded three-layer B:A:B structure where the ratio of layers is 15:70:15. The B:A:B structure can also optionally have a ratio of B:A that is greater than 20:60 or less than 15:70. In one or more implementations, the LLDPE can comprise greater than 50% of the overall thermoplastic material in the film 10*c*.

In another example, the film 10*c* is a coextruded three-layer C:A:B structure where the ratio of layers is 20:60:20. The C layer 11*c* can comprise a LLDPE material with a first colorant (e.g., black). The B layer 11*e* can also comprise a LLDPE material with a second colorant (e.g., white). The LLDPE material can have a MI of 1.0 and density of 0.920 g/cm3. The A core layer 11*d* can comprise similar materials to any of the core layer describe above. The A core layer 11*d* can comprise a black colorant, a white colorant, or can be clear.

In still further embodiments, the multi-layer film can comprise any number of co-extruded layers. For example, in one or more embodiments, the multi-layer film comprises more than three co-extruded films (e.g., four or more films).

As mentioned above, one or more implementations involve creating ring-rolled ribs at an angle to the machine direction to increase the tear resistance and optionally other strength properties of a film. To create the angled ring-rolled ribs, one or more implementations involve passing one or more films (singly or together) through a pair of intermeshing ring rolls. For example, FIG. 2A illustrates a set of TD ring rollers while FIG. 2B illustrates creating a set of alternating thicker and thinner ribs by passing a film through a set of TD ring rollers with ridges or teeth oriented at an angle to the machine direction of the film passing through the TD ring rollers.

Figure 2A:
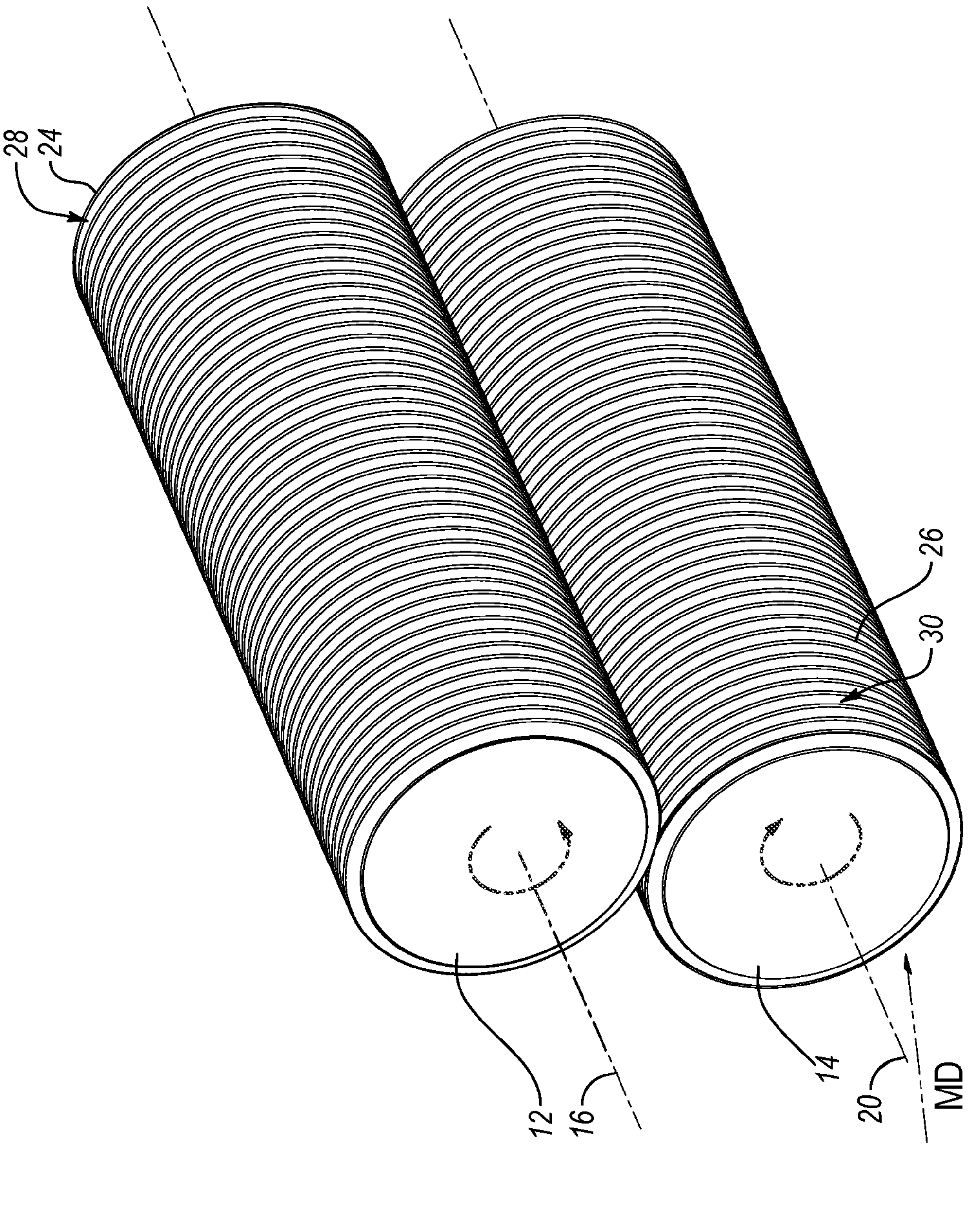
FIG. 2A illustrates a pair of TD ring rollers in accordance with one or more implementations.
Figure 2B:
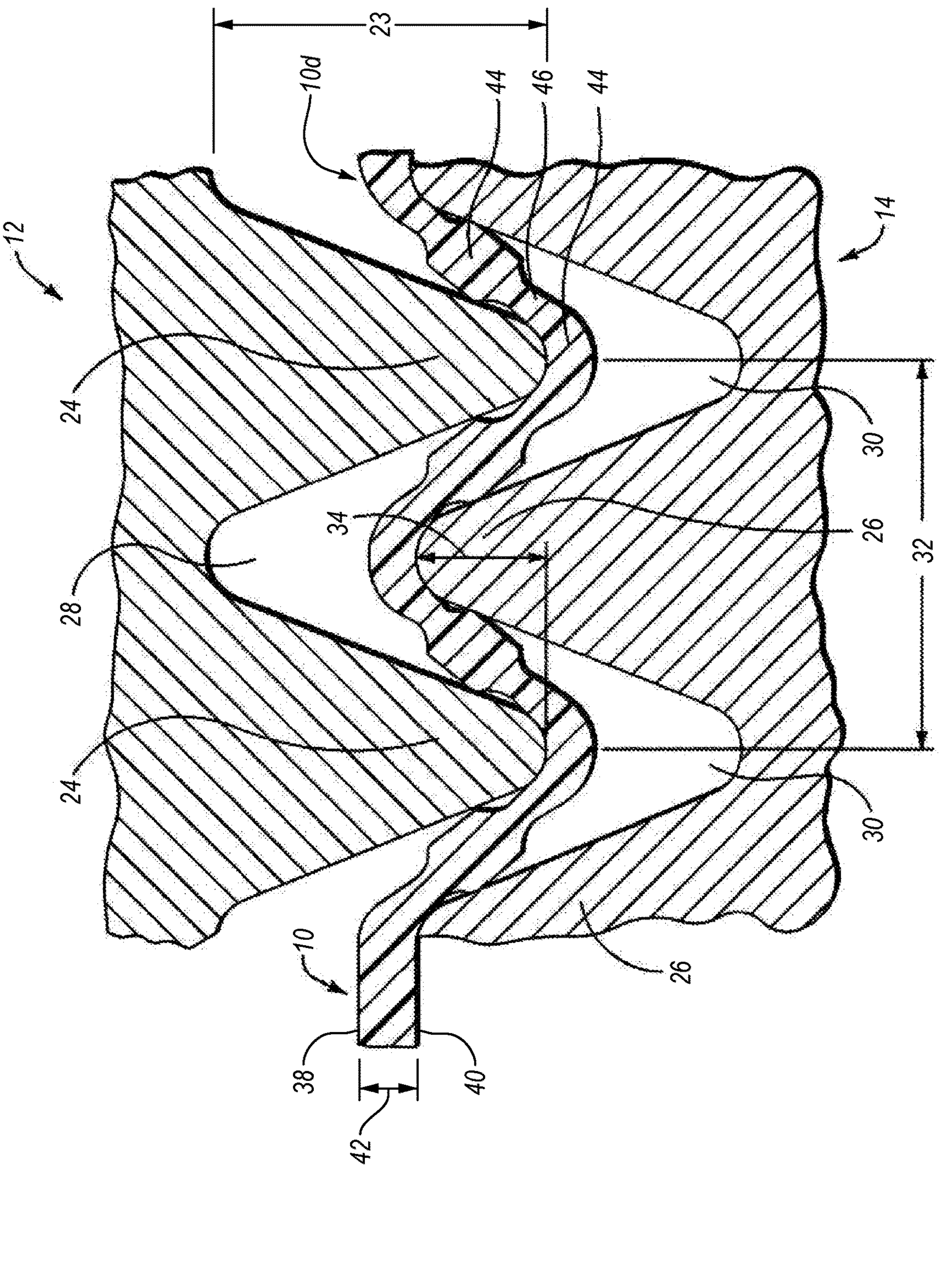
FIG. 2B illustrates an enlarged view of a portion of the flat thermoplastic film passing through the TD ring rollers of FIG. 2A in accordance with one or more implementations.

As shown by FIG. 2A, the set of TD ring rollers includes a first TD ring roller 12 and a second TD ring roller 14. The first roller 12 and the second roller 14 can each have a generally cylindrical shape. The set of TD ring rollers 12, 14 may be made of cast and/or machined metal, such as, steel, aluminum, or any other suitable material. The set of TD ring rollers 12, 14 can rotate in opposite direction about parallel axes of rotation. For example, FIG. 2A illustrates that the first roller 12 can rotate about a first axis 16 of rotation in a counterclockwise direction. FIG. 2A also illustrates that the second roller 14 can rotate about a second axis 20 of rotation in a clockwise direction. As shown by FIG. 2A, the axes of rotation 16, 20 are set at an angle relative to the machine direction. Alternatively, the axes of rotation 16, 20 are perpendicular to the machine direction and the ridges are oriented at an acute angle relative to the axes of rotation 16, 20 rather than being perpendicular to the axes of rotation 16, 20 as shown in FIG. 2A.

The set of TD ring rollers 12, 14 can closely resemble fine pitch spur gears. In particular, the set of TD ring rollers 12, 14 can include a plurality of protruding ridges 24, 26. The ridges 24, 26 can extend along the set of TD ring rollers 12, 14 in a direction generally perpendicular to axes of rotation 16, 20. Furthermore, the ridges 24, 26 can extend generally radially outward from the axes of rotation 16, 20. The tips of ridges 24, 26 can have a variety of different shapes and configurations. For example, the tips of the ridges 24, 26 can have a rounded shape as shown in FIG. 2B. In alternative implementations, the tips of the ridges 24, 26 can have sharp angled corners. In another implementation, each of the ridges 24, 26 can be in the shape of an inverted "V." FIGS. 2A and 2B also illustrate that grooves 28, 30 can separate adjacent ridges 24, 26.

The ridges 24 on the first roller 12 can be offset or staggered with respect to the ridges 26 on the second roller 14. Thus, the grooves 28 of the first roller 12 can receive the ridges 26 of the second roller 14, as the set of TD ring rollers 12, 14 intermesh. Similarly, the grooves 30 of the second roller 14 can receive the ridges 24 of the first roller 12. In one or more implementations, the ridges 24, 26 will not contact each other or transmit rotational torque during an intermeshing stretching operation.

One will appreciate in light of the disclosure herein that the configuration of the ridges 24, 26 and grooves 28, 30 can prevent contact between ridges 24, 26 during intermeshing. Additionally, the configuration of the ridges 24, 26 and grooves 28, 30 can dictate the amount of stretching caused by the set of TD ring rollers 12, 14.

Referring specifically to FIG. 2B, various features of the ridges 24, 26 and grooves 28, 30 are shown in greater detail. The pitch and depth of engagement of the ridges 24, 26 can determine, at least in part, the amount of incremental stretching created by the set of TD ring rollers 12, 14. As shown by FIG. 2B, the pitch 32 is the distance between the tips of two adjacent ridges on the same roller. The "depth of engagement" (DOE) 34 is the amount of overlap between ridges 24, 26 of the different set of TD ring rollers 12, 14 during intermeshing. The ratio of DOE 34 to pitch 32 can determine, at least in part, the amount of stretch imparted by a pair of set of TD ring rollers 12, 14.

By way of example, the DOE 34 may have a first range from about 0.010 inches (0.025 cm) to about 0.080 inches (0.203 cm), a second range from about 0.02 inches (0.05 cm) to about 0.070 inches (0.178 cm), and a third range from about 0.030 inches (0.076 cm) to about 0.060 inches (0.152 cm). In one or more implementations, the DOE 34 may be about 0.055 inches (0.140 cm). The pitch 32 may have a first range from about 0.02 inches (0.05 cm) to about 0.20 inches (0.51 cm), a second range from about 0.03 inches (0.07 cm) to about 0.10 inches (0.25 cm), and a third range from about 0.035 inches (0.089 cm) to about 0.075 inches (0.191 cm). In one implementation, the pitch 32 may be about 0.040 inches (0.102 cm).

By way of example, the height 23 may have a first range from about 0.02 inches (0.05 cm) to about 0.4 inches (1.02 cm), a second range from about 0.04 inches (0.1 cm) to about 0.2 inches (0.51 cm), and a third range from about 0.06 inches (0.15 cm) to about 0.15 inches (0.38 cm). In one or more implementations, the height 23 may be about 0.08 inches (0.2 cm). To form the desired shape on the cylindrical rollers, the rollers may be cast, ground or etched as appropriate.

The direction of travel of the film 10 through the set of TD ring rollers 12, 14 is parallel to the machine direction and at an acute angle to the ridges 24, 26. As the thermoplastic film 10 passes between the set of TD ring rollers 12, 14, the ridges 24, 26 can incrementally stretch the film 10 both in the machine direction and in the transverse direction. In one or more implementations, stretching the film 10 in the machine direction and the transverse direction can reduce the average gauge of the film and increase the length and width of the film 10. In other implementations, the film 10 may rebound after being stretched such that the average gauge of the film 10 is not substantially decreased.

In particular, as the film 10 proceeds between the set of TD ring rollers 12, 14, the ridges 24 of the first roller 12 can push the film 10 into the grooves 30 of the second roller 14 and vice versa. The pulling of the film 10 by the ridges 24, 26 can stretch the film 10. The set of TD ring rollers 12, 14 may not stretch the film 10 evenly. Specifically, the rollers 12, 14 can stretch the portions of the film 10 between the ridges 24, 26 more than the portions of the film 10 that contact the ridges 24, 26. Thus, the set of TD ring rollers 12, 14 can impart or form a ribbed pattern into the film 10. As used herein, the terms "impart" and "form" refer to the creation of a desired structure or geometry in a film upon stretching the film that will at least partially retain the desired structure or geometry when the film is no longer subject to any strains or externally applied forces.

As the film 10 is directed between the rollers 12, 14, the ridges 24 on the first roller 12 displace the film material between the ridges 26 on the second roller 14. To facilitate displacement of the film or web between the ridges of the rollers, the rollers may be pressed or forced together, for example, by hydraulic equipment or other equipment, such as, hydraulic actuators. The pressure at which the rollers are pressed together may be in a first range from about 30 PSI (2.04 atm) to about 100 PSI (6.8 atm), a second range from about 60 PSI (4.08 atm) to about 90 PSI (6.12 atm), and a third range from about 75 PSI (5.10 atm) to about 85 PSI (5.78 atm). In one embodiment, the pressure may be about 80 PSI (5.44 atm).

Because the surface area of the film 10 is increased, it will be appreciated that more film can be made from the web material than prior to ring rolling. Thus, one possible result of ring rolling the web material is the cost savings benefit that the process provides. Another possible result of stretching the web out via the interacting rollers is that the molecules of the thermoplastic material may realign or re-orientate themselves. This may result in the web material corresponding to the first rib becoming stronger compared to the same thickness of a web material which was not stretched via the rollers.

In one or more implementations, prior to passing through the set of TD ring rollers 12, 14, the film 10 may not include a visually perceivable ribbed pattern. For example, FIG. 2B illustrates that the flat film 10 (i.e., the film that is yet to pass through the intermeshing rollers 12, 14) can have a substantially flat top surface 38 and substantially flat bottom surface 40. The flat film 10 can have an initial thickness or starting gauge 42 extending between its major surfaces (i.e., the top surface 38 and the bottom surface 40). In at least one implementation, the starting gauge 42 can be substantially uniform along the length of the flat film 10.

The flat and often pre-ring-rolled film 10 need not have an entirely flat top surface 38. Indeed, the top surface 38 can be rough or uneven. Similarly, bottom surface 40 of the pre-ring-rolled film 10 can also be rough or uneven. Further, the starting gauge 42 need not be consistent or uniform throughout the entirety of pre-ring-rolled film 10. Thus, the starting gauge 42 can vary due to intentional product design, manufacturing defects, tolerances, or other processing inconsistencies.

FIG. 2B illustrates that the set of TD ring rollers 12, 14 can process the flat film 10 into an incrementally-stretched film 10*d*. As previously mentioned, the incrementally-stretched film 10*d* can include a ribbed pattern. The ribbed pattern can include alternating series of thicker sections or ribs 44 and thinner sections or ribs 46. The thicker ribs 44 can comprise "un-stretched" or "less-stretched" regions and the thinner ribs 46 can comprise stretched regions. In one or more implementations, the thicker ribs 44 regions of the incrementally-stretched films may be stretched to a small degree. In any event, the thicker ribs 44 are stretched less than the thinner ribs 46. The ribs 44, 46 can extend across the incrementally-stretched film 10*d* at an acute angle relative to the machine direction (i.e., the predominate direction of molecular orientation of the film 10).

One will appreciate in light of the disclosure herein that the ribbed pattern may vary depending on the method used to incrementally stretch the film 10. To the extent that TD ring rollers are used to incrementally stretch the film 10, the ribbed pattern on the film 10*d* can depend on the pitch 32 of the ridges 24, 26, the DOE 34, and other factors. In some implementations, the molecular structure of the thermoplastic material of the film 10 may be rearranged to provide this shape memory.

Figure 3A:
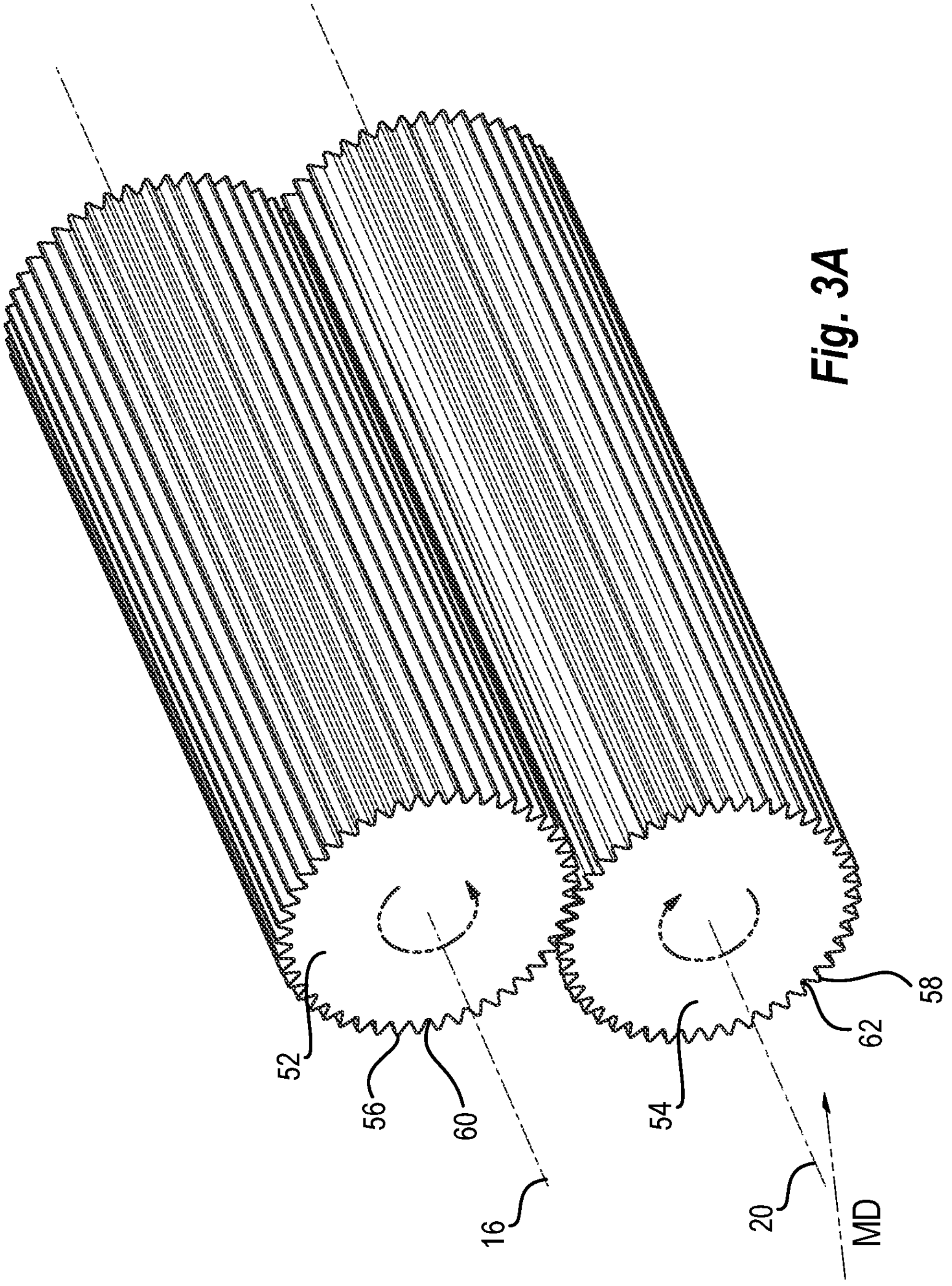
FIG. 3A illustrates a pair of MD ring rollers in accordance with one or more implementations.
Figure 3B:
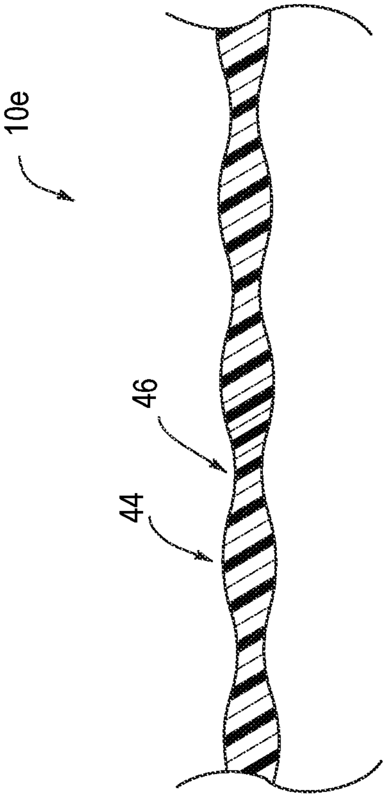
FIG. 3B illustrates an enlarged view of a portion of the thermoplastic film with a pattern of alternating thicker ribs and thinner ribs formed using the MD ring rollers of FIG. 3A in accordance with one or more implementations.

In addition to using TD ring rollers to create a pattern of thicker and thinner ribs extending at an acute angle to the machine direction, one or more implementations of the present invention further include additionally, or alternatively, using MD ring rollers do to so. For example, FIG. 3A illustrates a set of MD ring rollers 52, 54 and FIG. 3B illustrates an incrementally stretched thermoplastic film 10*e* created by passing a film through the set MD ring rollers 52, 54. The set of MD ring rollers 52, 54 are similar to the TD ring rollers 12, 14 described herein above, albeit that the ridges 56, 58 and grooves 60, 62 of the MD ring rollers 52, 54 extend generally parallel to the axes of rotation 16, 20. As shown by FIG. 3A, the axes of rotation 16, 20 are set at an angle relative to the machine direction. Alternatively, the axes of rotation 16, 20 are perpendicular to the machine direction and the ridges are oriented at an acute angle relative to the axes of rotation 16, 20 rather than being perpendicular to the axes of rotation 16, 20 as shown in FIG. 3A.

The direction of travel of the film through the set of MD ring rollers 52, 54 is parallel to the machine direction and at an acute angle to the ridges 56, 58. As the thermoplastic film passes between the set of MD ring rollers 52, 54, the ridges 56, 58 can incrementally stretch the film both in the machine direction and in the transverse direction. In one or more implementations, stretching the film in the machine direction and the transverse direction can reduce the average gauge of the film and increase the length and width of the film. In other implementations, the film may rebound after being stretched such that the average gauge of the film is not substantially decreased.

In particular, as a film proceeds between the MD ring rollers 52, 54, the ridges 56 of the first roller 52 can push the film into the grooves 62 of the second roller 54 and vice versa. The pulling of the film by the ridges 56, 58 can stretch the film. The MD ring rollers 52, 54 may not stretch the film evenly along its length. Specifically, the rollers 56, 58 can stretch the portions of the film between the ridges 56, 58 more than the portions of the film that contact the ridges 56, 58. Thus, the MD intermeshing rollers 52, 54 can impart or form a ribbed pattern into a film passed therethrough with alternating thicker and thinner ribs extending in a direction at an acute angle to the machine direction.

In particular, FIG. 3B illustrates a portion of an incrementally-stretched film 10*e*. As previously mentioned, the incrementally-stretched film 10*e* can include a ribbed pattern. The ribbed pattern can include alternating series of thicker sections or ribs 44 and thinner sections or ribs 46. The thicker ribs 44 can comprise "un-stretched" or "less-stretched" regions and the thinner ribs 46 can comprise stretched regions. In one or more implementations, the thicker ribs 44 regions of the incrementally-stretched films may be stretched to a small degree. In any event, the thicker ribs 44 are stretched less than the thinner ribs 46. The ribs 44, 46 can extend across the incrementally-stretched film 10*e* at an acute angle relative to the machine direction (i.e., the predominate direction of molecular orientation of the film 10*e*).

As mentioned, one or more implementations include imparting a pattern alternating thicker and thinner ribs at an acute angle to the machine direction in a film to increase the tear resistance and other film properties. As discussed above, one or more implementations comprise forming such films by passing them through a set of ring rolls with the ridges oriented at an acute angle to the machine direction. FIGS. 4A-6B illustrate top views of films having a pattern alternating thicker and thinner ribs at an acute angle to the machine direction.

Figure 4B:
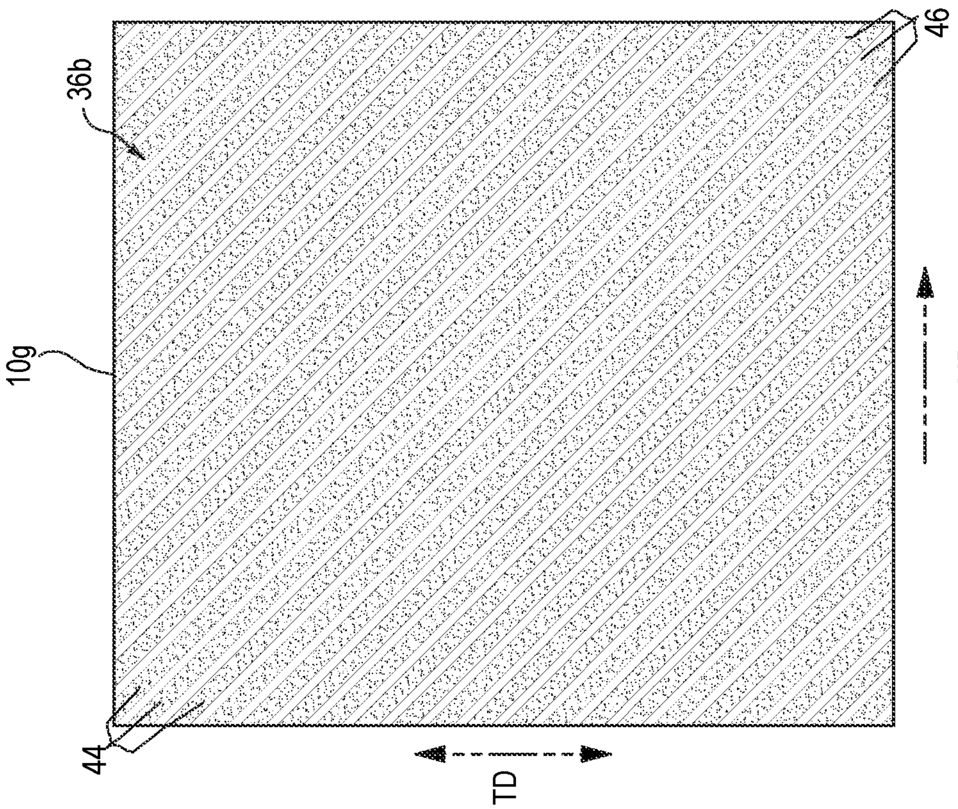
FIGS. 4A-4B illustrate views of an incrementally-stretched thermoplastic film with a pattern of alternating thicker ribs and thinner ribs extending at a 45-degree angle relative to the machine direction in accordance with one or more implementations.
Figure 4A:
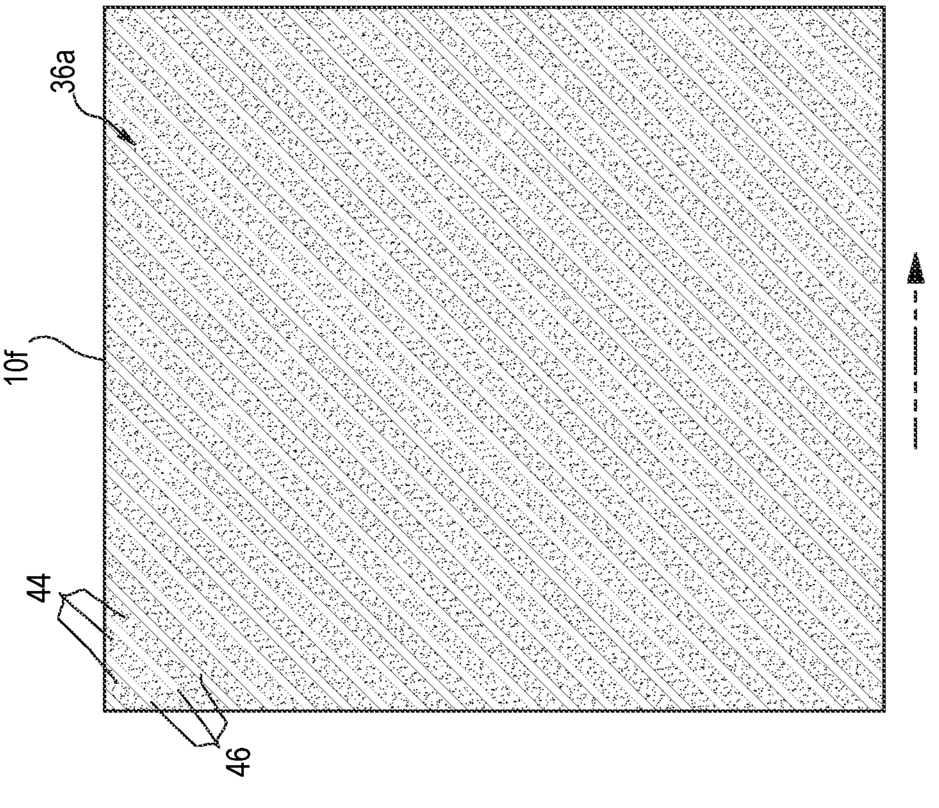

For example, FIG. 4A illustrates a top view of an incrementally-stretched thermoplastic film 10*f* with a pattern 36*a* of alternating thicker ribs 44 and thinner ribs 46 that extend across the incrementally-stretched thermoplastic film 10*f* at an acute angle to the machine direction (i.e., the predominate direction of molecular orientation of the film). In particular, the alternating thicker ribs 44 and thinner ribs 46 extend across the thermoplastic film 10*f* at an acute angle of 45 degrees relative to the machine direction. More specifically, the alternating thicker ribs 44 and thinner ribs 46 extend across the thermoplastic film 10*f* at a positive acute angle of 45 degrees. As used herein, a positive acute angle is an angle measured going counterclockwise from the machine direction.

FIG. 4B illustrates a top view of an incrementally-stretched thermoplastic film 10*g* with a pattern 36*b* of alternating thicker ribs 44 and thinner ribs 46 that extend across the incrementally-stretched thermoplastic film 10*g* at an acute angle to the machine direction (i.e., the predominate direction of molecular orientation of the film). In particular, the alternating thicker ribs 44 and thinner ribs 46 extend across the thermoplastic film 10*g* at a negative acute angle of 45 degrees relative to the machine direction. As used herein, a negative acute angle is an angle measured going clockwise from the machine direction.

Figure 5B:
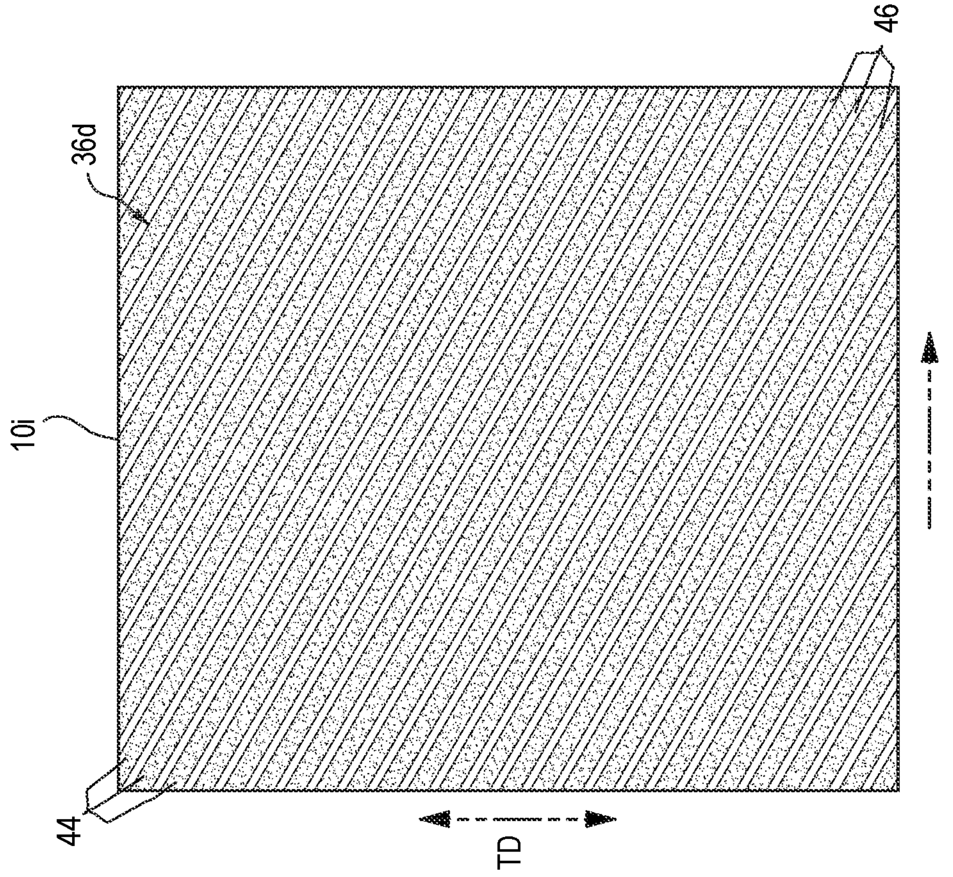
FIGS. 5A-5B illustrate views of an incrementally-stretched thermoplastic film with a pattern of alternating thicker ribs and thinner ribs extending at a 30-degree angle relative to the machine direction in accordance with one or more implementations.
Figure 5A:
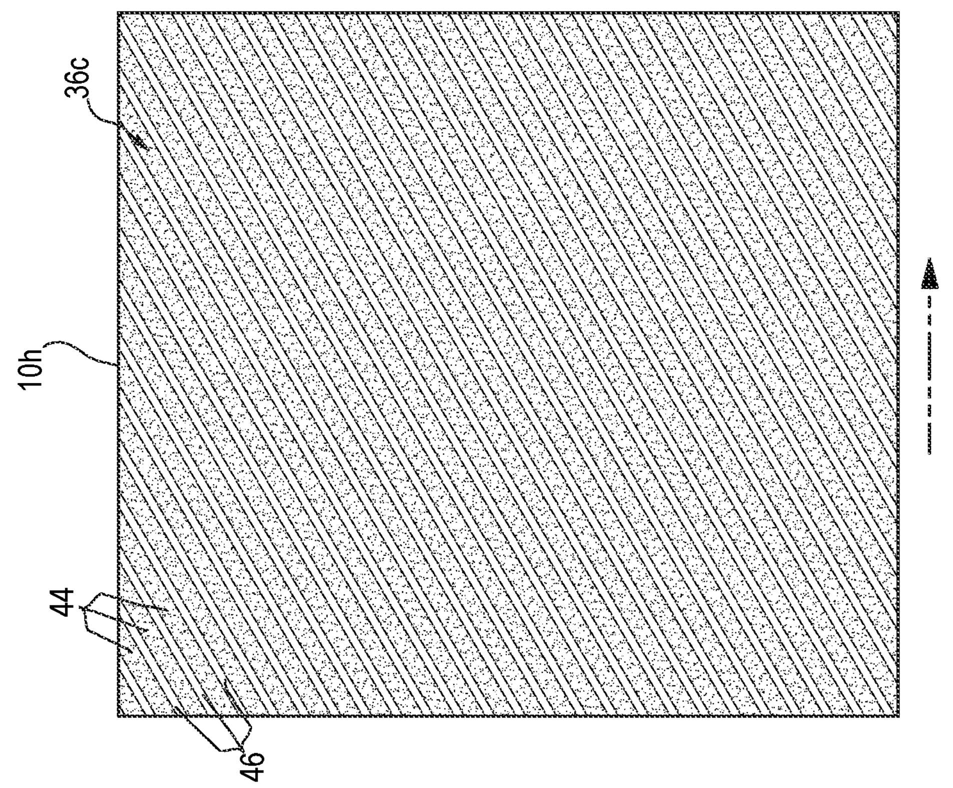

FIG. 5A illustrates a top view of an incrementally-stretched thermoplastic film 10*h* with a pattern 36*c* of alternating thicker ribs 44 and thinner ribs 46 that extend across the incrementally-stretched thermoplastic film 10*h* at an acute angle to the machine direction (i.e., the predominate direction of molecular orientation of the film). In particular, the alternating thicker ribs 44 and thinner ribs 46 extend across the thermoplastic film 10*h* at a positive acute angle of 30 degrees relative to the machine direction. Relatedly, FIG. 5B illustrates a top view of an incrementally-stretched thermoplastic film 10*i* with a pattern 36*d* of alternating thicker ribs 44 and thinner ribs 46 that extend across the incrementally-stretched thermoplastic film 10*i* at an acute angle to the machine direction (i.e., the predominate direction of molecular orientation of the film). In particular, the alternating thicker ribs 44 and thinner ribs 46 extend across the thermoplastic film 10*i* at a negative acute angle of 30 degrees relative to the machine direction.

Figure 6B:
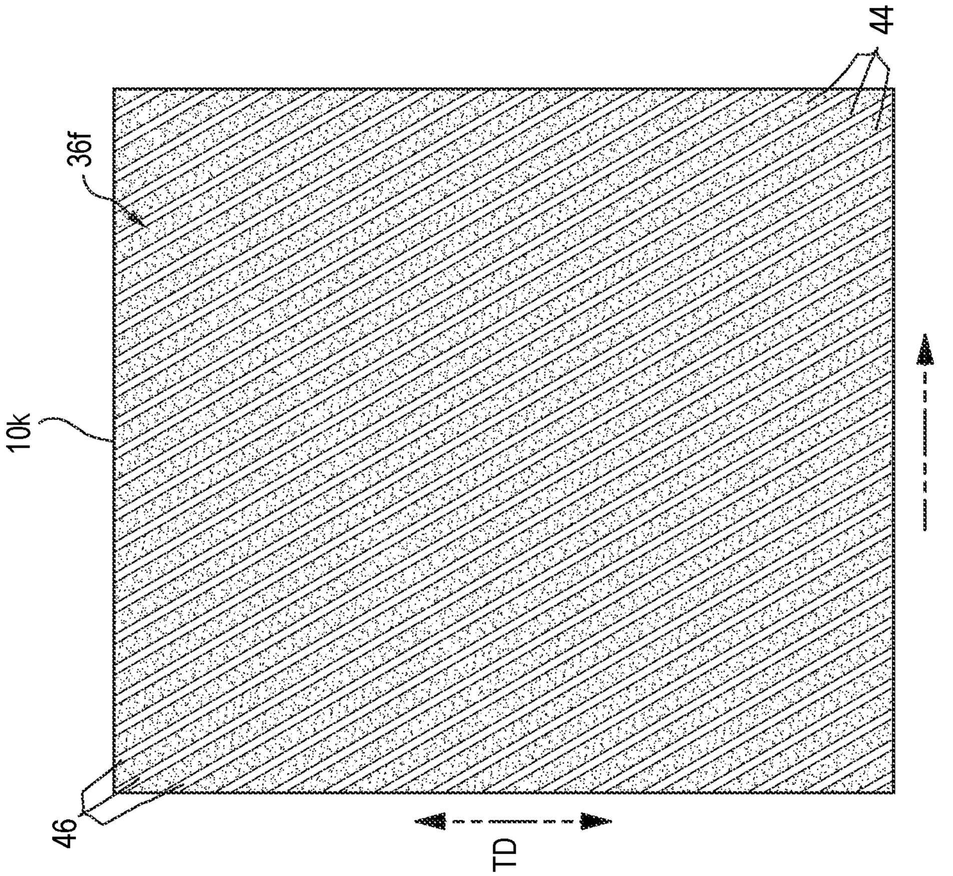
FIGS. 6A-6B illustrate views of an incrementally-stretched thermoplastic film with a pattern of alternating thicker ribs and thinner ribs extending at a 60-degree angle relative to the machine direction in accordance with one or more implementations.
Figure 6A:
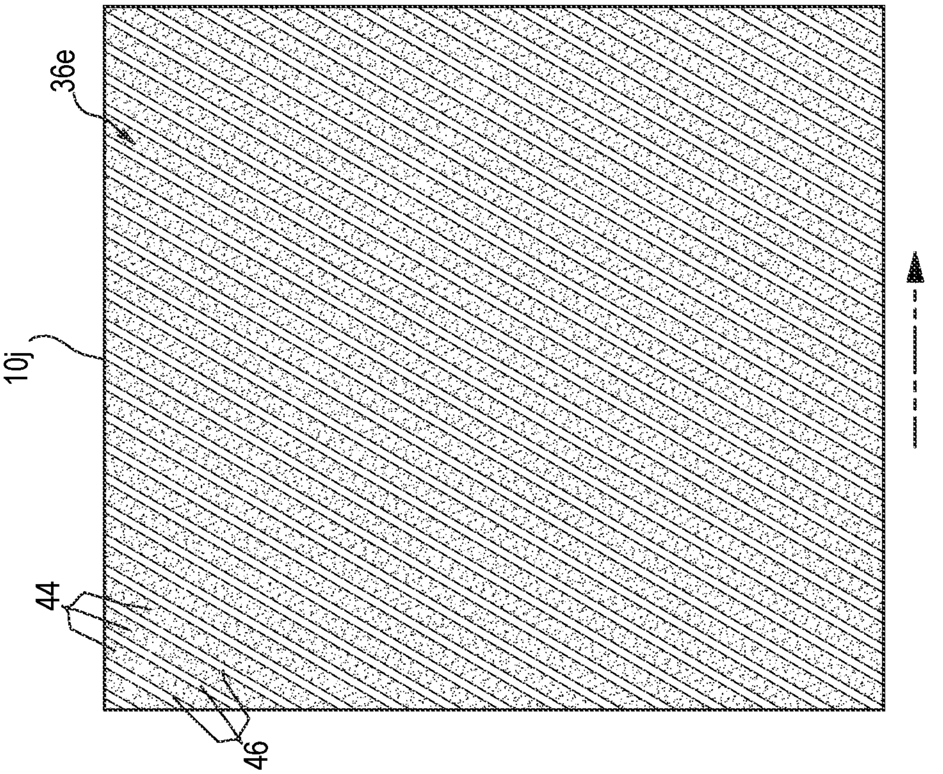

FIG. 6A illustrates a top view of an incrementally-stretched thermoplastic film 10*j* with a pattern 36*e* of alternating thicker ribs 44 and thinner ribs 46 that extend across the incrementally-stretched thermoplastic film 10*j* at an acute angle to the machine direction (i.e., the predominate direction of molecular orientation of the film). In particular, the alternating thicker ribs 44 and thinner ribs 46 extend across the thermoplastic film 10*j* at a positive acute angle of 60 degrees relative to the machine direction. Relatedly, FIG. 6B illustrates a top view of an incrementally-stretched thermoplastic film 10*k* with a pattern 36*f* of alternating thicker ribs 44 and thinner ribs 46 that extend across the incrementally-stretched thermoplastic film 10*k* at an acute angle to the machine direction (i.e., the predominate direction of molecular orientation of the film). In particular, the alternating thicker ribs 44 and thinner ribs 46 extend across the thermoplastic film 10*k* at a negative acute angle of 60 degrees relative to the machine direction.

The alternating thicker ribs 44 and thinner ribs 46 shown in FIGS. 4A-6B extend across the entire films. The pitch and the DOE of the ridges of the ring rolls can determine the width and spacing of the alternating thicker ribs 44 and thinner ribs 46. Thus, by varying the pitch and/or DOE, the width and/or spacing of the alternating thicker ribs 44 and thinner ribs 46, the amount of stretching the film undergoes, and the effects of the stretching on the physical properties can be varied.

In the illustrated implementations, the alternating thicker ribs 44 and thinner ribs 46 extend parallel with each other and at the same relative angle to the machine direction. In the illustrated implementations, the alternating thicker ribs 44 and thinner ribs 46 are equally spaced ribs. In other implementations, the alternating thicker ribs 44 and thinner ribs 46 are unequally spaced apart from each other.

In the illustrated implementations, the thinner ribs 46 are intermittently dispersed about thicker ribs 44. In particular, each thinner rib 46 can reside between adjacent thicker ribs 44. The alternating thicker ribs 44 and thinner ribs 46 provide a pleasing appearance and connote strength to a consumer. For example, the stripped pattern can signify that the film has undergone a physical transformation to modify one or more characteristics of the film. For example, ring rolling the film to create angled alternating thicker ribs 44 and thinner ribs 46 can increase or otherwise modify one or more of the tensile strength, tear resistance, impact resistance, or elasticity of the film. The ribbed pattern can signify the physical transformation to a consumer.

Additionally, the films 10*f*-10*k* can comprise any of the films 10*a*-10*c* and material described above. In particular, in one or more implementations, the films 10*f*-10*k* comprise post-consumer reclaim materials or lower grade materials or composites thereof that have strength parameters (e.g., tear resistances) similar to higher grade materials (e.g., material without post-consumer reclaim) due to the pattern of alternating thicker and thinner ribs at an acute angle to the machine direction. For instance, in one or more implementations, a film comprising butene copolymer LLDPE (a lower-grade polymer) and a pattern alternating thicker and thinner ribs at an acute angle to the machine direction has strength parameters comparable to a film comprising hexene copolymer LLDPE (a higher-grade polymer). Thus, by providing a pattern of alternating thicker and thinner ribs at an acute angle to the machine direction, one or more implementations allow for the use of polymers traditionally thought of as unsuitable for trash bags and other products in trash bags and other products without sacrificing strength parameters such as tear resistance.

One will appreciate that the example acute angles of 45/−45, 30/−30, and 60/−60 shown above in FIGS. 4A-6B are example acute angles. One or more alternative implementations include films with a pattern of alternating thicker and thinner ribs extending at another acute angle to the machine direction. For example, one or more implementations can include pattern of alternating thicker and thinner ribs extending positive or negative angles of 5, 10, 15, 20, 25, 35, 40, 50, 55, 65, 70, 75, 80, or 85 degrees or other acute angles.

Figure 7A:
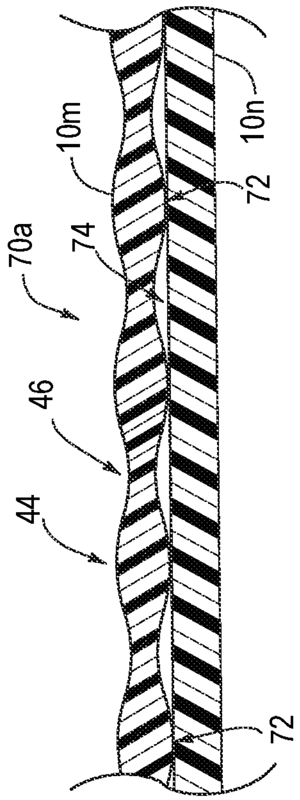
FIGS. 7A-7B illustrate respective cross-sectional views of multi-film thermoplastic structures in accordance with one or more implementations.

Additionally, as mentioned above, one or more implementations include multi-film structures (e.g., multi-film laminate structures) comprising one or more films having a pattern of alternating thicker and thinner ribs extending at an acute angle to the machine direction. For example, one or more implementations include a first film having a pattern of alternating thicker and thinner ribs extending at an acute angle to the machine direction and a second film having no ribs, ribs extending parallel or perpendicular to the machine direction, or ribs extending at an acute angle to the machine direction. For example, FIG. 7A illustrates a multi-film structure 70*a* comprising a first thermoplastic film 10*m* comprising a pattern of alternating thicker ribs 44 and thinner ribs 46 that extend at an acute angle to the machine direction. The first thermoplastic film 10*m* is discontinuously bonded to the second thermoplastic film 10*n*. In particular, the multi-film structure 70*a* can include bonded regions or bonds 72 and un-bonded regions 74. For example, FIG. 7A illustrates that the thicker ribs 44 of the first thermoplastic film 10*m* are bonded to the second thermoplastic film 10*n* while the stretched (i.e., thinner) ribs 46 are not bonded to the second thermoplastic film 10*n*. In particular, a gap 74 or un-bonded region can separate the second thermoplastic film 10*n* from the first thermoplastic film 10*m* at the thinner ribs 46.

In one or more implementations, the second thermoplastic film 10*n* comprises a flat non-incrementally stretched film that is bonded to the first thermoplastic film 10*m* by the bonds 72. For example, the plurality of non-continuous bonds 72 may include a plurality of discontinuous adhesive bonds. In alternative implementations, the plurality of non-continuous bonds can comprise ultrasonic bonds, pressure bonds, heat bonds, or a combination of pressure and tackifying agents in one or more of the films.

In one or more implementations, the plurality of non-continuous bonds 72 can have a bond strength that is less than a weakest tear resistance of each of the first thermoplastic film 10*m* and the second thermoplastic film 10*n*. In this manner, the plurality of non-continuous bonds 72 can be designed to fail prior to failing of the first thermoplastic film 10*m* or the second thermoplastic film 10*n*. Indeed, one or more implementations include the plurality of non-continuous bonds 72 that release just prior to any localized tearing of the first thermoplastic film 10*m* or the second thermoplastic film 10*n*. In particular, the plurality of non-continuous bonds 72 between the first thermoplastic film 10*m* and the second thermoplastic film 10*n* can act to first absorb forces via breaking of the plurality of non-continuous bonds 72 prior to allowing that same force to cause failure of the first thermoplastic film 10*m* or the second thermoplastic film 10*n*. Such action can provide increased strength to the multi-film structure 70*a*.

This is beneficial as it has been found that thermoplastic films often exhibit strength characteristics that are approximately equal to the strength of the weakest layer. Providing relatively weak bonding between the first thermoplastic film 10*m* and the second thermoplastic film 10*n* has surprisingly been found to increase the strength. As more explicitly covered in U.S. patent application Ser. No. 12/947,025 filed Nov. 16, 2010, and entitled DISCONTINUOUSLY LAMINATED FILM, incorporated by reference herein, the MD and TD tear values of non-continuously laminated films in accordance with one or more implementations can exhibit significantly improved strength properties, despite a reduced gauge. In particular, the individual values for the Dynatup, MD tear resistance, and TD tear resistance properties in non-continuously laminated films of one or more implementations are unexpectedly higher than the sum of the individual layers. Thus, first thermoplastic film 10*m* and the second thermoplastic film 10*n* can provide a synergistic effect.

In one or more implementations rather than being a flat film, the second thermoplastic film 10*n* comprises an incrementally stretched thermoplastic film. For example, as mentioned above, in one or more implementations the second thermoplastic film 10*n* comprises a pattern of alternating thicker ribs 44 and thinner ribs 46 that extend at an acute angle to the machine direction. For instance, the portion of the second thermoplastic film 10*n* shown in FIG. 7A, in one or more implementations comprises a thicker rib 44. Thus, the thicker ribs 44 of the second thermoplastic film 10*n* are bonded to the thicker ribs 44 of the first thermoplastic film 10*m*.

More specifically, in one or more implementations, the first thermoplastic film 10*m* comprises a pattern of alternating thicker ribs 44 and thinner ribs 46 that extend at a first acute angle to the machine direction. The second thermoplastic film 10*n* comprises a pattern of alternating thicker ribs 44 and thinner ribs 46 that extend at a second acute angle to the machine direction. In one or more implementations, the first and second acute angles are equal. In another implementation, the first acute angle is positive, and the second acute angle is negative. For example, the first thermoplastic film 10*m* comprises one of the films 10*f*, 10*h*, 10*j* described above and the second thermoplastic film 10*n* comprises one of the films 10*g*, 10*i*, 10*k* described above.

In one or more implementations, the alternating thicker ribs 44 and thinner ribs 46 of the first thermoplastic film 10*m* extend in a non-parallel direction to the alternating thicker ribs 44 and thinner ribs 46 of the second thermoplastic film 10*n*. For example, the first thermoplastic film 10*m* comprises one of the film 10*f* and the second thermoplastic film 10*n* comprises the film 10*g*, or the first thermoplastic film 10*m* comprises one of the film 10*h* and the second thermoplastic film 10*n* comprises the film 10*i*, or the first thermoplastic film 10*m* comprises one of the film 10*j* and the second thermoplastic film 10*n* comprises the film 10*k* described above. In such implementations the multi-film structure 70*a* comprises a crossed rib laminate. In one or more implementations, the alternating thicker ribs 44 and thinner ribs 46 of the first thermoplastic film 10*m* extend at a complementary angle to the alternating thicker ribs 44 and thinner ribs 46 of the second thermoplastic film 10*n*. In another implementation, the alternating thicker ribs 44 and thinner ribs 46 of the first thermoplastic film 10*m* extend orthogonally to the alternating thicker ribs 44 and thinner ribs 46 of the second thermoplastic film 10*n*. In still further implementations, the multi-film structure 70*a* is a faux cross laminate. In particular, in one or more implementations, the machine direction of the first thermoplastic film 10*m* is parallel to the machine direction of the second thermoplastic film 10*n* such that the molecular orientation (e.g., the machine direction) of each of the films is aligned or parallel. As mentioned above, crossed rib laminates can provide even greater increased to tear resistance and other strength properties.

In particular, various multi-film structures were tested to determine the effects of both alternating thicker ribs 44 and thinner ribs 46 extending at an acute angle and alternating thicker ribs 44 and thinner ribs 46 in different layers that cross (i.e., are oriented orthogonally to each other). As an initial matter, a control multi-film structure of two flat unbonded films included a measured machine direction tear resistance of 269 grams. A multi-film structure with two unbonded films both having alternating thicker ribs 44 and thinner ribs 46 extending at an acute angle of 34 degrees relative to the machine direction included a measured machine direction tear resistance of 298 grams. In other words, forming alternating thicker ribs 44 and thinner ribs 46 extending at an acute angle of 34 degrees in each of the film layers raised the machine direction tear resistance by over ten percent. Still further, a multi-film structure with two films with the first film having alternating thicker ribs 44 and thinner ribs 46 extending at a positive acute angle of 34 degrees relative to the machine direction and the second film having alternating thicker ribs 44 and thinner ribs 46 extending at a negative acute angle of 34 degrees included a measured machine direction tear resistance of 531 grams. In other words, having a first plurality of alternating thicker and thinner ribs in a first film layer extend orthogonally relative to a second plurality of alternating thicker and thinner ribs in a second film layer almost doubled the machine direction tear resistance compared to control multi-film structure.

Figure 7B:
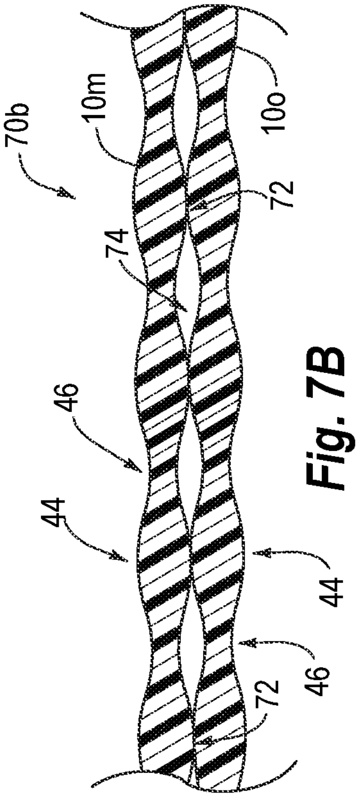

FIG. 7B illustrates another multi-film structure 70*b* where the first thermoplastic film 10*m* comprises a pattern of alternating thicker ribs 44 and thinner ribs 46 that extend at a first acute angle to the machine direction. The second thermoplastic film 10*o* comprises a pattern of alternating thicker ribs 44 and thinner ribs 46 that extend at a second acute angle to the machine direction. In the implementation shown, the first and second acute angles are equal such that the first plurality of alternating thicker ribs 44 and thinner ribs 46 of the first thermoplastic film 10*m* extend parallel to the second plurality of alternating thicker ribs 44 and thinner ribs 46 of the second thermoplastic film 10*o*. In one or more implementations, the multi-film structure 70*b* is formed by passing the first thermoplastic film 10*m* and the second thermoplastic film 10*o* together through a pair of ring rollers with the ridges set at an acute angle relative to the machine direction of the first thermoplastic film 10*m* and the second thermoplastic film 10*o*. By passing the films together through the ring rollers, the first plurality of alternating thicker ribs 44 and thinner ribs 46 of the first thermoplastic film 10*m* and the second plurality of alternating thicker ribs 44 and thinner ribs 46 of the second thermoplastic film 10*o* are formed together. Furthermore, the thicker ribs 44 of the first thermoplastic film 10*m* and the second thermoplastic film 10*o* are bonded together by light pressure bonds created when passing the films through the ring rollers.

One will appreciate in light of the disclosure herein that the thermoplastic films/multi film structures with alternating thicker ribs 44 and thinner ribs 46 extending at an acute angle to the machine direction described above can form part of any type of product made from, or incorporating, thermoplastic films. For instance, grocery bags, trash bags, sacks, packaging materials, feminine hygiene products, baby diapers, adult incontinence products, sanitary napkins, bandages, food storage bags, food storage containers, thermal heat wraps, facial masks, wipes, hard surface cleaners, and many other products can include lightly bonded multi-layer films to one extent or another. Trash bags and food storage bags may be particularly benefited by the films and methods of the present invention.

Figure 8:
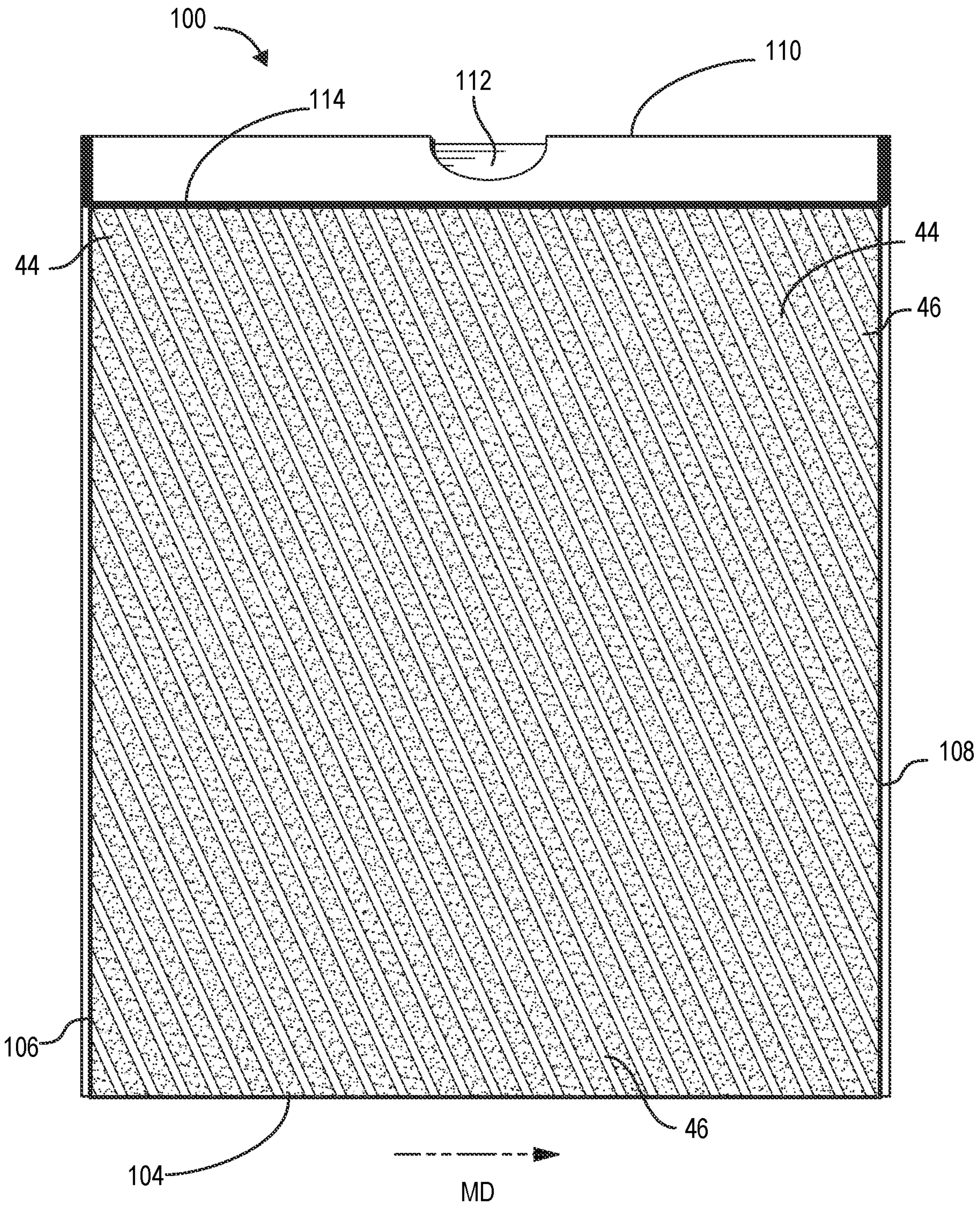
FIG. 8 illustrates a thermoplastic bag with a pattern of alternating thicker ribs and thinner ribs extending at an acute angle relative to the machine direction in accordance with one or more implementations.

Referring to FIG. 8, a flexible thermoplastic bag 100 of one or more implementations of the present invention is shown. The thermoplastic bag 100 can include a bag body formed from first and second sidewalls folded along a bag bottom 104. Side seals 106 and 108 can bond the sides of the two sidewalls together to form a semi-enclosed container having an opening along an upper edge 110. When placed in a trash receptacle, a top portion of the first and second thermoplastic sidewalls may be folded over the rim of the receptacle.

The thermoplastic bag 100 also optionally includes closure means 112 located adjacent to the upper edge 110 for sealing the top of the thermoplastic bag 100 to form a fully-enclosed container or vessel. In particular, the top edges of the first and second sidewalls can each be folded back into the interior volume and may be attached to the thermoplastic bag 100 via respective hem seals 114 and/or side seals 106, 108 (e.g., at the first and second side edges). Indeed, to accommodate the draw tape 112 the first top edge of the first thermoplastic sidewall may be folded back onto the interior surface of the first thermoplastic sidewall, thereby forming a first hem channel disposed within a first hem. Similarly, the second top edge of the second thermoplastic sidewall may be folded back onto the interior surface of the second thermoplastic sidewall, thereby forming a second hem channel disposed within a second hem. In one or more implementations, the draw tape 112 extends loosely through the hem channels of the hems. To access the draw tape 112, first and second hem holes may be disposed through the respective first and second hems. Pulling the draw tape 112 through the first and second hem holes will constrict the first and second hems thereby closing or reducing the opening of the thermoplastic bag 100.

The thermoplastic bag 100 is suitable for containing and protecting a wide variety of materials and/or objects. In alternative implementations, in place of a draw tape, the closure means 112 can comprise flaps, adhesive tapes, a tuck and fold closure, an interlocking closure, a slider closure, a zipper closure or other closure structures known to those skilled in the art for closing a bag.

Each of the sidewalls can comprise a thermoplastic film or multi-film thermoplastic structure. For example, in one or more implementations, the thermoplastic bag 100 comprises a single layer bag. The thermoplastic film can form first and second sidewalls joined along a bottom edge, a first side edge, and an opposing second side edge. In particular, the bottom edge of the thermoplastic film can comprise a fold. Additionally, the thermoplastic bag 100 can have sidewalls formed from a thermoplastic film having a pattern of alternating thicker ribs 44 and thinner ribs 46 extending at an acute angle to the machine direction (e.g., any of films 10*f*-10*k*). The pattern of alternating thicker ribs 44 and thinner ribs 46 extending at an acute angle to the machine direction provides the thermoplastic bag 100 with increased strength parameters (e.g., machine direction tear resistance).

Optionally, the thermoplastic bag 100 can also include a second film of thermoplastic material. In other words, each sidewall can comprise a multi-film structure (e.g., 70*a*, 70*b*). The second film can include first and second sidewalls joined along a bottom edge, a first side edge, and an opposing second side edge. As discussed above, the second film can comprise a flat film, a film with traditional ring rolling, a film with a plurality of raised rib-like elements formed as part of a structural elastic-like film process (SELFing), or a pattern of alternating thicker ribs 44 and thinner ribs 46 extending at an acute angle to the machine direction (e.g., any of films 10*f*-10*k*).

Additionally, the second film is positioned within the first film. Furthermore, the first film and the second film are optionally non-continuously bonded to each other as described above. Such a configuration may be considered a "bag-in-bag" configuration. In other words, the thermoplastic bag 100 can include a second thermoplastic bag positioned within a first thermoplastic bag. Each of the first and second bags can include a first pair of opposing sidewalls joined together along three edges. A plurality of non-continuous bonded regions can secure the first and second thermoplastic bags together.

Figure 9:
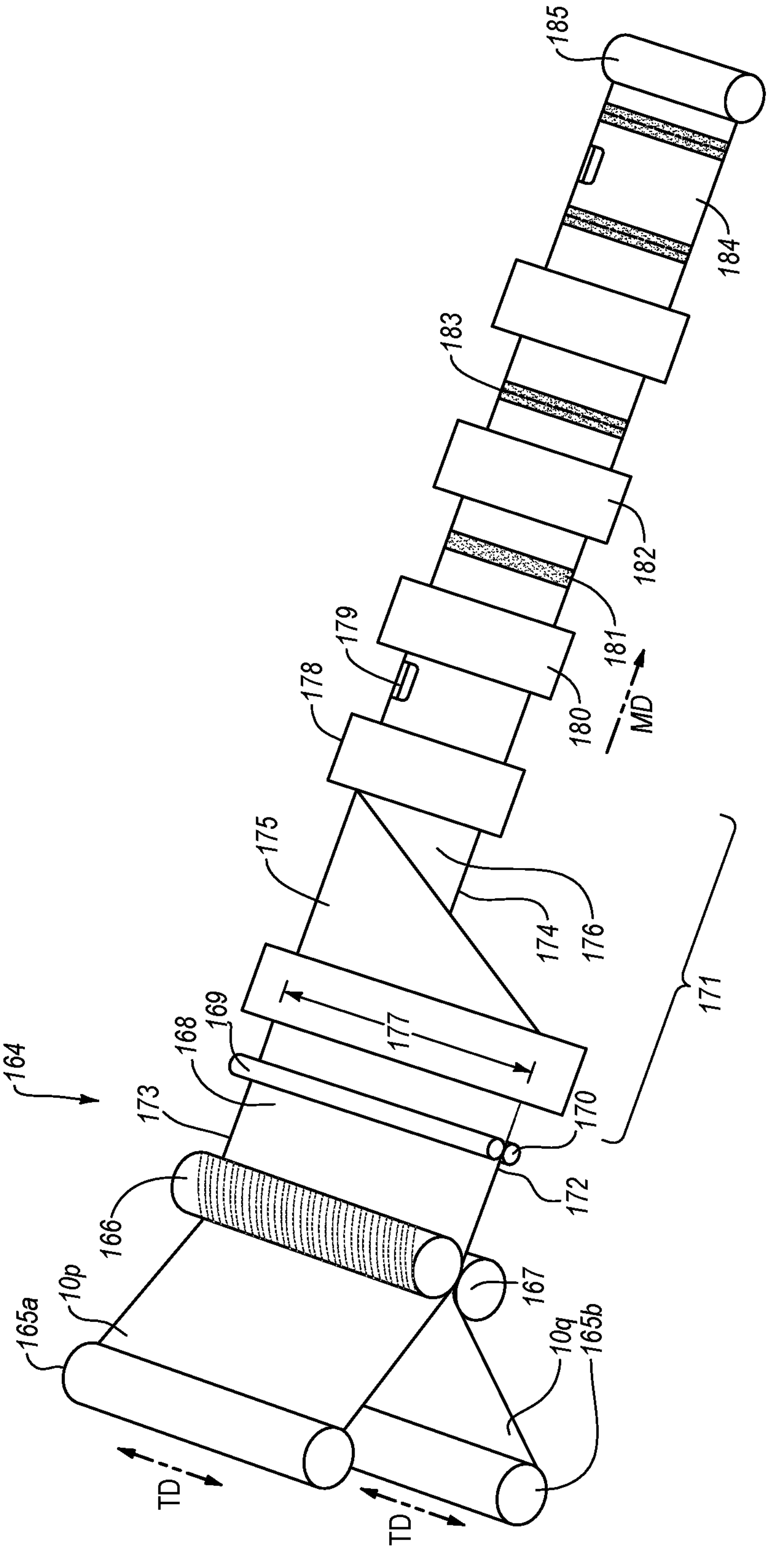
FIG. 9 illustrates an example manufacturing process for forming thermoplastic bags with patterns of alternating thicker ribs and thinner ribs extending at an acute angle relative to the machine direction in accordance with one or more implementations.
Figure 10:
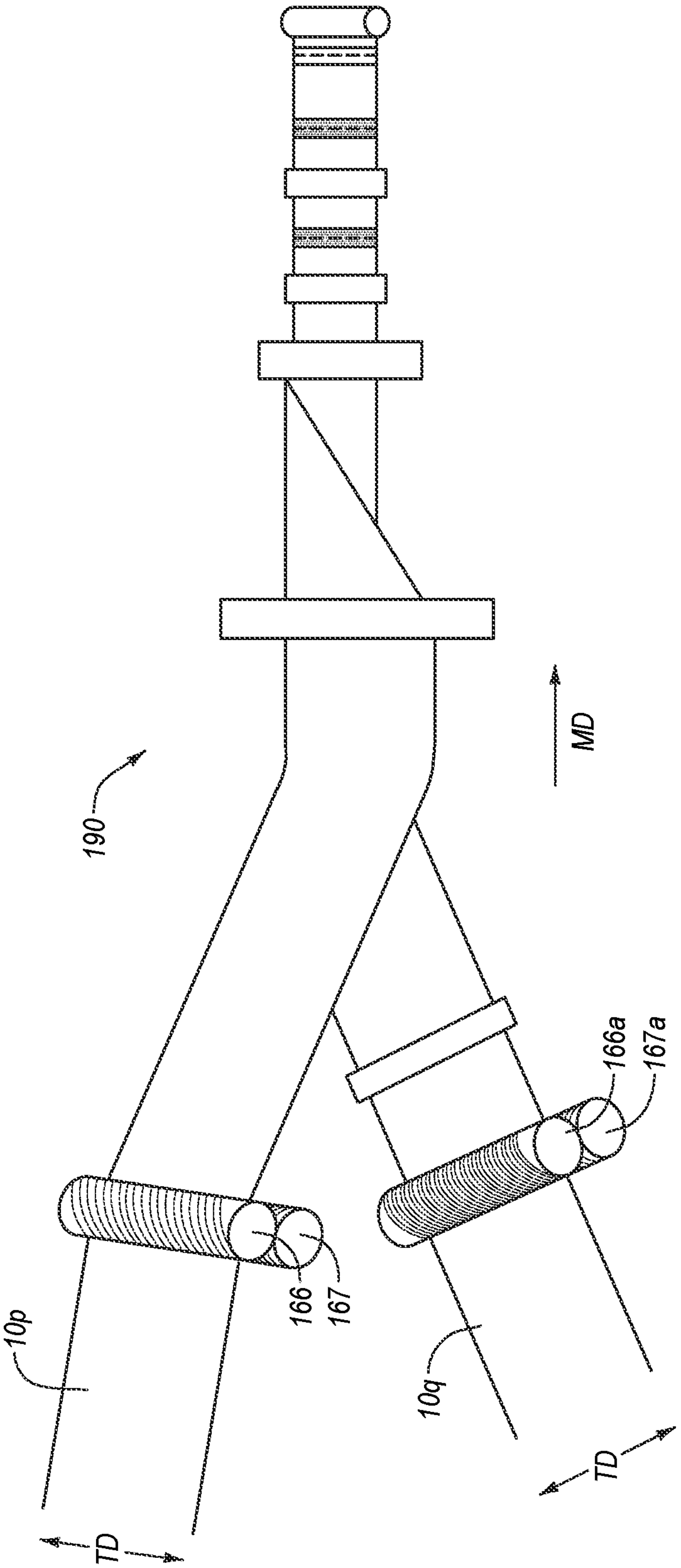
FIG. 10 illustrates another example manufacturing process for forming thermoplastic bags with patterns of alternating thicker ribs and thinner ribs extending at an acute angle relative to the machine direction in accordance with one or more implementations.

Implementations of the present invention can also include methods of forming bags having a pattern of thicker and thinner ribs that extend at an acute angle to the machine direction of the film(s) in which they are formed. FIGS. 9-10 and the accompanying description describe such methods. Of course, as a preliminary matter, one of ordinary skill in the art will recognize that the methods explained in detail herein can be modified. For example, various acts of the method described can be omitted or expanded, additional acts can be included, and the order of the various acts of the method described can be altered as desired.

FIG. 9 illustrates an exemplary embodiment of a high-speed manufacturing process 164 for creating thermoplastic bags with sidewalls having a pattern of thicker and thinner ribs that extend at an acute angle to the machine direction of the film(s) forming the sidewalls. According to the process 164, a first thermoplastic film layer 10*p* and a second thermoplastic film layer 10*q* are unwound from roll 165*a* and 165*b*, respectively, and directed along a machine direction.

The film layers 10*p*, 10*q* may pass between first and second cylindrical ring rollers 166, 167 to incrementally stretch and create a pattern of thicker and thinner ribs that extend at an acute angle to the machine direction of the film layers 10*p*, 10*q*. In particular, as the ridges of the first and second cylindrical ring rollers 166, 167 are set at an acute angle to the machine direction, the first and second cylindrical ring rollers 166, 167 form thicker and thinner ribs that extend an acute angle to the machine direction. The first and second cylindrical ring rollers 166, 167 also can lightly laminate the initially separate film layers 10*p*, 10*q* to create a multi-film structure 168.

The ring rollers 166, 167 may be arranged so that their longitudinal axes are perpendicular to the machine direction. Additionally, the rollers 166, 167 may rotate about their longitudinal axes in opposite rotational directions as described above. In various embodiments, motors may be provided that power rotation of the ring rollers 166, 167 in a controlled manner.

During the manufacturing process 164, the multi-film structure 168 can also pass through a pair of pinch rollers 169, 170. The pinch rollers 169, 170 can be appropriately arranged to grasp the multi-film structure 168.

A folding operation 171 can fold the multi-film structure 168 to produce the sidewalls of the finished bag. The folding operation 171 can fold the multi-film structure 168 in half along the transverse direction. In particular, the folding operation 171 can move a first edge 172 adjacent to the second edge 173, thereby creating a folded edge 174. The folding operation 171 thereby provides a first film half 175 and an adjacent second web half 176. The overall width 177 of the second film half 176 can be half the width 177 of the pre-folded multi-film structure 168.

To produce the finished bag, the processing equipment may further process the folded multi-film structure 168. In particular, a draw tape operation 178 can insert a draw tape 179 into edges 172, 173 of the multi-film structure 168. Furthermore, a sealing operation 180 can form the parallel side edges of the finished bag by forming heat seals 181 between adjacent portions of the folded multi-film structure 168. The heat seal 181 may strongly bond adjacent layers together in the location of the heat seal 181 so as to tightly seal the edges of the finished bag. The heat seals 181 may be spaced apart along the folded multi-film structure 168 to provide the desired width to the finished bags. The sealing operation 180 can form the heat seals 181 using a heating device, such as, a heated knife.

A perforating operation 182 may form a perforation 183 in the heat seals 181 using a perforating device, such as, a perforating knife. The perforations 183 in conjunction with the folded outer edge 174 can define individual multi-layered bags with angled ribs 184 that may be separated from the multi-film structure 168. A roll 185 can wind the multi-film structure 168 embodying the finished bags 184 for packaging and distribution. For example, the roll 185 may be placed into a box or bag for sale to a customer.

In still further implementations, the folded multi-film structure 168 may be cut into individual bags along the heat seals 181 by a cutting operation. In another implementation, the folded multi-film structure 168 may be folded one or more times prior to the cutting operation. In yet another implementation, the side sealing operation 180 may be combined with the cutting and/or perforation operations 182.

One will appreciate in light of the disclosure herein that the process 164 described in conjunction with FIG. 9 can be modified to omit or expand acts, vary the order of the various acts, or otherwise alter the process, as desired. For example, rather than creating a thermoplastic bag with multi-layered sidewalls, the process 164 can omit the use of film 10*q* such that singled layered bags with a pattern of thicker and thinner ribs that extend at an acute angle to the machine direction of the film are formed. In still further implementations, the ring rollers 166, 167 are positioned after the folding operation 171 rather than before the folding operation 171.

FIG. 10 illustrates another manufacturing process 190 for producing multi-layered bag with a pattern of thicker and thinner ribs that extend at an acute angle to the machine direction of the film are formed therefrom. The process 190 can be similar to process 164 of FIG. 9, except that each film layer 10*p* and 10*q* may be run through intermeshing ring rollers 166, 167 and 166*a*, 167*a*, respectively, prior to an optional discontinuous lamination of layers 10*p* and 10*q* to one another. In this manner each of the films 10*p*, 10*q* can have a different pattern of thicker and thinner ribs that extend at an acute angle to the machine direction of the film are formed. Optionally, the ring rollers 166*a*, 167*a* have ridges that extend orthogonally to each other such that the resulting sidewalls have ribs that extend orthogonally to each other. In still further implementations, the rollers 166*a*, 167*a* comprise SELFing rollers, embossing rollers, or traditional ring rollers.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A multi-layer thermoplastic bag comprising:

a first thermoplastic bag formed from a first thermoplastic film, the first thermoplastic bag comprising first and second opposing sidewalls joined together along a first side edge, an opposite second side edge, an open first top edge, and a closed first bottom edge;

a second thermoplastic bag formed from a second thermoplastic film, the second thermoplastic bag being positioned within the first thermoplastic bag, the second thermoplastic bag comprising third and fourth opposing sidewalls joined together along a third side edge, an opposite fourth side edge, an open second top edge, and a closed second bottom edge;

a first plurality of alternating thicker and thinner ribs extending continuously across the first thermoplastic bag at a first acute angle relative to a machine direction of the first thermoplastic film; and a second plurality of alternating thicker and thinner ribs extending continuously across the second thermoplastic bag at a second acute angle relative to a machine direction of the second thermoplastic film, wherein the second acute angle is different from the first acute angle;

wherein the first plurality of alternating thicker and thinner ribs are configured to redirect propagating tears away from the machine direction of the first thermoplastic film.

2. The multi-layer thermoplastic bag of claim 1, wherein the second thermoplastic film is devoid alternating thicker and thinner ribs.

3. The multi-layer thermoplastic bag of claim 1, wherein one or more of the first thermoplastic film and the second thermoplastic film comprise a butene copolymer linear low-density polyethylene or post-consumer reclaim.

4. The multi-layer thermoplastic bag of claim 1, further comprising a plurality of bonds securing the thicker ribs of the first plurality of alternating thicker and thinner ribs to the thicker ribs of the second plurality of alternating thicker and thinner ribs.

5. The multi-layer thermoplastic bag of claim 4, wherein the plurality of bonds comprise pressure bonds, adhesive bonds, or heat bonds.

6. The multi-layer thermoplastic bag of claim 4, wherein the plurality of bonds have a bond strength that causes the plurality of bonds to fail prior to failing of the first thermoplastic film or the second thermoplastic film.

7. The multi-layer thermoplastic bag of claim 1, wherein the first plurality of alternating thicker and thinner ribs comprise angled machine direction ring rolling ribs.

8. The multi-layer thermoplastic bag of claim 7, wherein the second plurality of alternating thicker and thinner ribs comprise angled transverse direction ring rolling ribs.

9. A multi-layer thermoplastic bag comprising:

a first sidewall and a second sidewall, wherein each of the first sidewall and the second sidewall comprises:

a first thermoplastic film forming a first thermoplastic bag, the first thermoplastic bag comprising a first plurality of alternating thicker and thinner ribs extending continuously across the first thermoplastic bag at a first acute angle relative to a machine direction of the first thermoplastic film; and a second thermoplastic film forming a second thermoplastic bag comprising a second plurality of alternating thicker and thinner ribs extending continuously across the second thermoplastic bag at a second acute angle relative to a machine direction of the second thermoplastic film, wherein the second acute angle is different from the first acute angle;

wherein the first plurality of alternating thicker and thinner ribs are configured to redirect propagating tears away from the machine direction of the first thermoplastic film.

10. The multi-layer thermoplastic bag of claim 9, wherein the first plurality of alternating thicker and thinner ribs extend perpendicular to the second plurality of alternating thicker and thinner ribs.

11. The multi-layer thermoplastic bag of claim 9, wherein a basis weight of the first thermoplastic film comprising the first plurality of alternating thicker and thinner ribs is less than a basis weight of the first thermoplastic film prior to formation of the first plurality of alternating thicker and thinner ribs.

12. The multi-layer thermoplastic bag of claim 9, wherein a machine direction tear resistance of the first thermoplastic film comprising the first plurality of alternating thicker and thinner ribs is greater than a machine direction tear resistance of the first thermoplastic film prior to formation of the first plurality of alternating thicker and thinner ribs.

13. The multi-layer thermoplastic bag of claim 9, wherein a transverse direction tear resistance of the first thermoplastic film comprising the first plurality of alternating thicker and thinner ribs is greater than a transverse direction tear resistance of the first thermoplastic film prior to formation of the first plurality of alternating thicker and thinner ribs.

14. The multi-layer thermoplastic bag of claim 9, wherein the first acute angle and the second acute angle are between 30 degrees and 60 degrees.

15. The multi-layer thermoplastic bag of claim 9, further comprising a plurality of bonds securing the first thermoplastic film to the second thermoplastic film.

16. The multi-layer thermoplastic bag of claim 15, wherein the plurality of bonds have a bond strength that causes the plurality of bonds to fail prior to failing of the first thermoplastic film or the second thermoplastic film.

17. The multi-layer thermoplastic bag of claim 9, wherein:

the first acute angle is positive; and the second acute angle is negative.

18. The multi-layer thermoplastic bag of claim 17, wherein the machine direction of the first thermoplastic film is parallel to the machine direction of the second thermoplastic film.

* * * * *